(12) United States Patent
Kuwahara

(10) Patent No.: US 11,735,215 B2
(45) Date of Patent: Aug. 22, 2023

(54) MAGNETIC DISK DEVICE AND METHOD OF WRITING SPIRAL PATTERNS

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Satoshi Kuwahara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/685,910

(22) Filed: Mar. 3, 2022

(65) Prior Publication Data

US 2023/0084200 A1    Mar. 16, 2023

(30) Foreign Application Priority Data

Sep. 16, 2021    (JP) .................................. 2021-151330

(51) Int. Cl.
| | |
|---|---|
| *G11B 5/596* | (2006.01) |
| *H02K 5/16* | (2006.01) |
| *G11B 5/54* | (2006.01) |
| *G11B 5/588* | (2006.01) |

(52) U.S. Cl.
CPC ............ *G11B 5/59666* (2013.01); *G11B 5/54* (2013.01); *G11B 5/588* (2013.01); *G11B 5/59688* (2013.01); *H02K 5/165* (2013.01); *G11B 2220/2516* (2013.01)

(58) Field of Classification Search
CPC ... G11B 21/02; G11B 5/59627; G11B 5/5543; G11B 5/59633; G11B 5/59688; G11B 5/5965; G11B 5/59661; G11B 5/52; G11B 5/54
USPC .......................... 360/75, 78.14, 77.04, 77.08
See application file for complete search history.

(56) References Cited

U.S. PATENT DOCUMENTS

| | | | |
|---|---|---|---|
| 7,843,662 B1 * | 11/2010 | Weerasooriya .... | G11B 5/59666 360/78.14 |
| 8,514,510 B1 | 8/2013 | Sutardja | |
| 10,276,198 B1 | 4/2019 | Katchmart et al. | |
| 10,783,911 B1 | 9/2020 | Tsai et al. | |

* cited by examiner

*Primary Examiner* — Nabil Z Hindi
(74) *Attorney, Agent, or Firm* — Kim & Stewart LLP

(57) ABSTRACT

A magnetic disk device includes a disk, first and second heads, a motor, and a controller. The disk includes a first surface and a second surface opposite to the first surface. The first head is configured to perform reading and writing with respect to the first surface. The second head is configured to perform reading and writing with respect to the second surface. The motor is configured to move the first and second heads with respect to the first and second surfaces, respectively, along a radial direction of the disk. The controller is configured to alternately activate the first and second heads to perform writing of a plurality of spiral patterns on the first and second surfaces of the disk, respectively, while controlling the motor to move the first and second heads at a predetermined constant speed with respect to the first and second surfaces in the radial direction.

20 Claims, 22 Drawing Sheets

MAGNETIC DISK DEVICE AND METHOD OF WRITING SPIRAL PATTERNS

CROSS-REFERENCE TO RELATED APPLICATION

This application is based upon and claims the benefit of priority from Japanese Patent Application No. 2021-151330, filed Sep. 16, 2021, the entire contents of which are incorporated herein by reference.

FIELD

Embodiments described herein relate generally to a magnetic disk device and a method of writing spiral patterns.

BACKGROUND

A magnetic disk device performs a process of blank disk writing (BDW) to write spiral servo patterns on a surface of a disk in which no data or pattern has been written. During an initial step of the BDW, the magnetic disk device may write a plurality of spiral servo patterns (hereinafter, may be referred to as a coarse guide spiral (CGS) servo pattern) on the surface of the disk. When two adjacent CGS servo patterns are significantly close to each other or intersect at a position of the surface, the magnetic disk device may not be able to perform on-track or seek operations. This is because the data written at the portion where these two adjacent servo patterns are close to each other or intersect may be lost.

DETAILED DESCRIPTION

Embodiments provide a magnetic disk device and a method of writing spiral patterns with improved reliability.

In general, according to an embodiment, a magnetic disk device includes a disk, first and second heads, a motor, and a controller. The disk includes a first surface and a second surface opposite to the first surface. The first head is configured to perform reading and writing with respect to the first surface. The second head is configured to perform reading and writing with respect to the second surface. The motor is configured to move the first and second heads with respect to the first and second surfaces, respectively, along a radial direction of the disk. The controller is configured to alternately activate the first and second heads to perform writing of a plurality of spiral patterns on the first and second surfaces of the disk, respectively, while controlling the motor to move the first and second heads at a predetermined constant speed with respect to the first and second surfaces in the radial direction.

Hereinafter, embodiments will be described with reference to drawings. The drawings are merely examples and do not limit the scope of the disclosure.

First Embodiment

Figure 1:
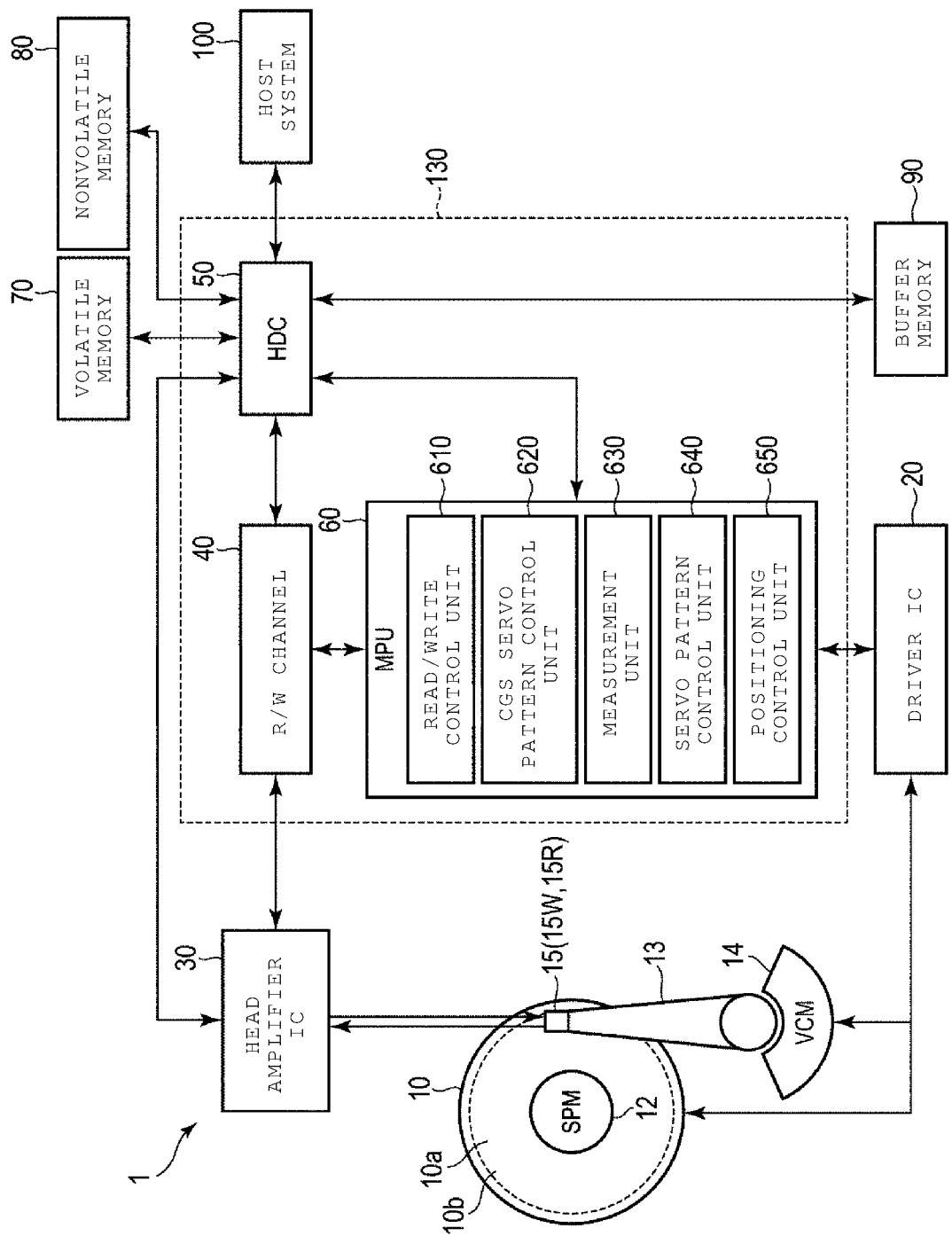
FIG. 1 is a block diagram illustrating a configuration of a magnetic disk device according to a first embodiment.

FIG. 1 is a block diagram illustrating a configuration of a magnetic disk device 1 according to a first embodiment.

The magnetic disk device 1 includes a head disk assembly (HDA), a driver IC 20, a head amplifier integrated circuit (hereinafter, "head amplifier IC" or "preamplifier") 30, a volatile memory 70, a nonvolatile memory 80, a buffer memory (buffer) 90, and a system controller 130, which is a one-chip integrated circuit described below. In addition, the magnetic disk device 1 is connected to a host system (hereinafter, simply referred to as "host") 100.

The HDA includes one or more magnetic disks (hereinafter, referred to as "disk") 10, a spindle motor (hereinafter, referred to as "SPM") 12, a plurality of arms 13 on each of which a head 15 is mounted, and a voice coil motor (hereinafter, referred to as "VCM") 14. The one or more disks 10 are attached to the SPM 12 and rotates by driving the SPM 12. The arm 13 and the VCM 14 configure an actuator. The actuator controls the movement of the head 15 mounted on the arm 13 to a predetermined position on one of the one or more disks 10 by driving the VCM 14. A plurality of disks 10 and heads 15 are provided, respectively. Alternatively, only one disk 10 and one head 15 may be provided.

The disk 10 includes a user data area 10a available to users, a media cache 10b (sometimes, referred to as "media cache area" or "storage area") to temporarily store data (or commands) transferred from a host or the like before writing the data to a predetermined area of the user data area 10a, and a system area 10c to write information required for system management in an area where the data can be written. Hereinafter, the direction from the inner circumference to the outer circumference of the disk 10 or the direction from the outer circumference to the inner circumference of the disk 10 is referred to as radial direction. In the radial direction, the direction from the inner circumference to the outer circumference is referred to as an outward direction, and the direction from the outer circumference to the inner circumference is referred to as an inward direction. The direction orthogonal to the radial direction of the disk 10 is referred to as a circumferential direction. The circumferential direction corresponds to the direction along the circumference of the disk 10. The radial and circumferential directions are orthogonal to each other. Further, a predetermined position in the radial direction of the disk 10 may be referred to as a radial position, and a predetermined position in the circumferential direction of the disk 10 may be referred to as a circumferential position. The radial position and the circumferential position may be collectively referred to as a position. The disk 10 may be divided into a plurality of areas. For example, the disk 10 may be divided into areas (hereinafter, may be referred to as zones) containing a predetermined number of tracks in the radial direction. Each zone may be divided into multiple areas corresponding to tracks therein in the radial direction.

The term "track" is used to mean one of a plurality of recording areas in which the disk 10 is divided in the radial direction, a recording area for one lap at a predetermined radial position on the disk 10, a predetermined recording area at a predetermined radial position on the disk 10, a recording area extending in the circumferential direction of the disk 10, a recording area corresponding to the path of the head 15 positioned at a predetermined radial position on the disk 10, the path of the head 15 positioned at a predetermined radial position on the disk 10, data written in one recording area of a plurality of recording areas in which the disk 10 is divided in the radial direction, data written in a recording area for one lap at a predetermined radial position on the disk 10, data written in a predetermined recording area at a predetermined radial position on the disk 10, data written in the recording area extending in the circumferential direction of the disk 10, data written in the recording area corresponding to the path of the head 15 positioned at a predetermined radial position on the disk 10, data written along the path of the head 15 positioned at a predetermined radial position on the disk 10, data extending in the circumferential direction on the disk 10, data written on a predetermined track on the disk 10, one lap of data written on a predetermined track on the disk 10, a part of the data written on a predetermined track on the disk 10, and various other meanings. The term "sector" is used to mean one of a plurality of recording areas in which a predetermined track of the disk 10 is divided in the circumferential direction, one of a plurality of recording areas in which a recording area extending in the circumferential direction at a predetermined radial position on the disk 10 is divided, a predetermined recording area in a predetermined track on the disk 10, a predetermined circumferential position in a predetermined track on the disk 10, a predetermined circumferential position (predetermined position) at a predetermined radial position on the disk 10, data written in one recording area of a plurality of recording areas in which a predetermined track of the disk 10 is divided in the circumferential direction, data written in one recording area of a plurality of recording areas in which a recording area extending in the circumferential direction is divided at a predetermined radial position on the disk 10, data written in a predetermined recording area in a predetermined track on the disk 10, data written at a predetermined circumferential position in a predetermined track on the disk 10, data written at a predetermined circumferential position (predetermined position) at a predetermined radial position on the disk 10, data written in a predetermined sector, and various other meanings. The "width of the track in the radial direction" may be referred to as "track width". The "path passing through the center position of the track width in a predetermined track" may be referred to as "track center". The data available to users written in the user data area 10a may be referred to as user data.

The head 15 faces the disk 10. For example, one head 15 faces one surface of the disk 10. The head 15 includes a write head 15W and a read head 15R mounted on a slider. The write head 15W writes data on the disk 10. The read head 15R reads the data written on the disk 10. In addition, the "write head 15W" may be simply referred to as the "head 15", the "read head 15R" may be simply referred to as the "head 15", and "the write head 15W and the read head 15R" may be collectively referred to as the "head 15". The "center of the head 15" may be referred to as "head 15", the "center of the write head 15W" may be referred to as "write head 15W", and the "center of the read head 15R" may be referred to as "read head 15R". The "center of the write head 15W" may be simply referred to as the "head 15", and the "center of the read head 15R" may be simply referred to as the "head 15". "Positioning the center of the head 15 to the track center of a predetermined track" may be expressed as "positioning the head 15 to a predetermined track", "mounting the head 15 on a predetermined track", "locating the head 15 on a predetermined track", or the like.

Figure 2:
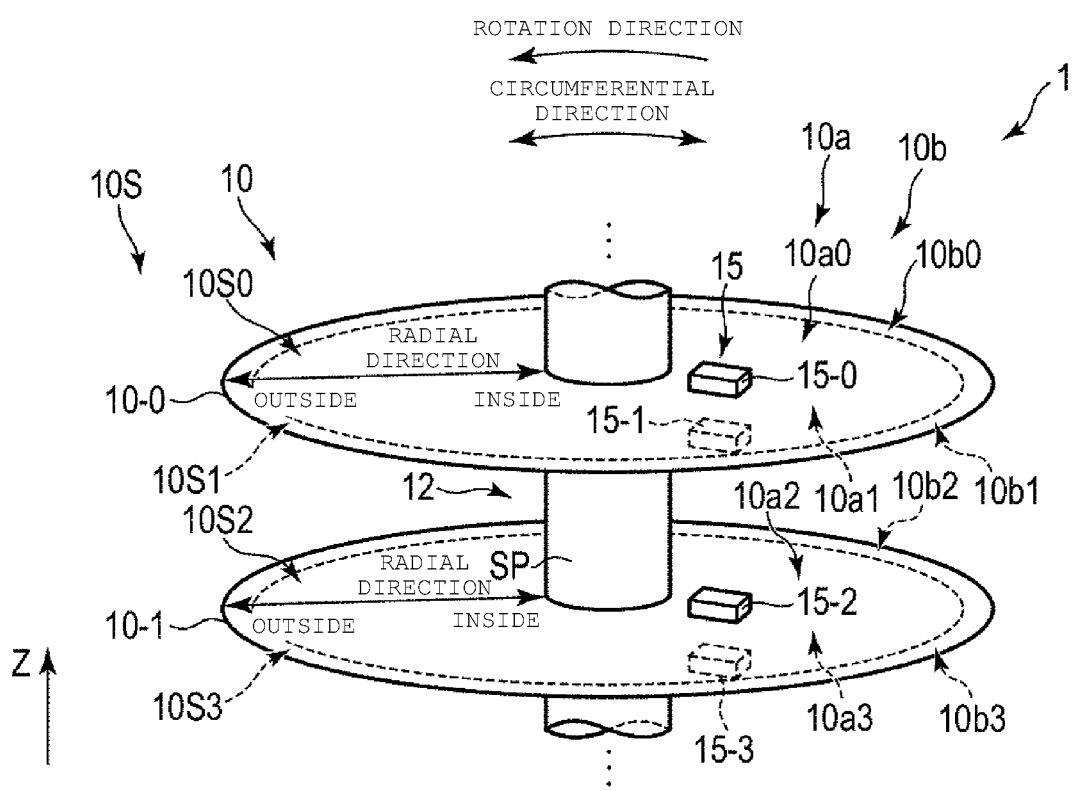
FIG. 2 is a schematic diagram illustrating an example of disk and heads positioned at the disks in the first embodiment.

FIG. 2 is a schematic diagram illustrating an example of the disks 10 and the heads 15 provided at the disks 10 in the present embodiment. As illustrated in FIG. 2, the direction in which the disk 10 rotates in the circumferential direction is referred to as a rotation direction. In the example illustrated in FIG. 2, the rotation direction is illustrated counterclockwise, but may be in the opposite direction (clockwise). A height direction Z is a direction parallel to the extension direction of a spindle SP of the SPM 12. In other words, the height direction Z is the direction in which a plurality of disks 10 are stacked. Further, the height direction Z corresponds to the direction from the bottom wall of the magnetic disk device 1 toward the cover facing the bottom wall. In the height direction Z, the direction from a disk 10-1 to a disk 10-0 may be referred to as an upper direction, and the direction from the disk 10-0 to the disk 10-1 may be referred to as a lower direction. Further, it is assumed that there is an observation position for observing the magnetic disk device 1 on the tip side of the arrow indicating the height direction Z, and viewing from this observation position toward the surface of the disk 10 may be referred to as a plan view.

In the example illustrated in FIG. 2, the SPM 12 includes a spindle SP. The spindle SP extends in the height direction Z.

In the example illustrated in FIG. 2, a plurality of disks 10 include disks 10-0, 10-1, . . . . The disks 10 are attached to the spindle SP. The disks 10 include surfaces 10S (10S0, 10S1, 10S2, 10S3, . . . ). The surfaces 10S (10S0, 10S1, 10S2, 10S3, . . . ) extend parallel to a plane extending perpendicular to the height direction Z. The surfaces 10S (10S0, 10S1, 10S2, 10S3, . . . ) may extend parallel to a plane tilted with respect to a plane extending perpendicular to the height direction Z. The disk 10-0 includes a front surface 10S0 and a back surface 10S1 opposite to the front surface 10S0. The front surface 10S0 is an upward surface in the height direction Z. The back surface 10S1 is a downward surface in the height direction Z. The back surface 10S1 is located below the front surface 10S0. The disk 10-1 includes a front surface 10S2 and a back surface 10S3 opposite the front surface 10S2. The front surface 10S2 is an upward surface in the height direction Z. The front surface 10S2 faces the back surface 10S1. The back surface 10S3 is a downward surface in the height direction Z. The back surface 10S3 is located below the front surface 10S2. The disk 10-1 is located below the disk 10-0. In a plan view, the disks 10-0 and 10-1 overlap. The surface 10S0 includes a user data area 10a0 and a system area 10b0. The back surface 10S1 includes a user data area 10a1 and a system area 10b1. The surface 10S2 includes a user data area 10a2 and a system area 10b2. The back surface 10S3 includes a user data area 10a3 and a system area 10b3.

The head 15 includes a plurality of heads 15. In the example illustrated in FIG. 2, the heads 15 include a head 15-0, a head 15-1, a head 15-2, a head 15-3, and the like. The heads 15 faces the surfaces 10S, respectively. Each of the plurality of heads 15 faces one surface 10S of the plurality of disks 10. In the example illustrated in FIG. 2, the head 15-0 faces the front surface 10S0. The head 15-0 writes data on the front surface 10S0 and reads data from the front surface 10S0. The head 15-1 faces the back surface 10S1. The head 15-1 writes data on the back surface 10S1 and reads data from the back surface 10S1. The head 15-2 faces the front surface 10S2. The head 15-2 writes data on the front surface 10S2 and reads data from the front surface 10S2. The head 15-3 faces the back surface 10S3. The head 15-3 writes data on the back surface 10S3 and reads data from the back surface 10S3. In addition, 5 or more heads 15 may be provided. Two or more disks 10 may be provided.

Figure 3:
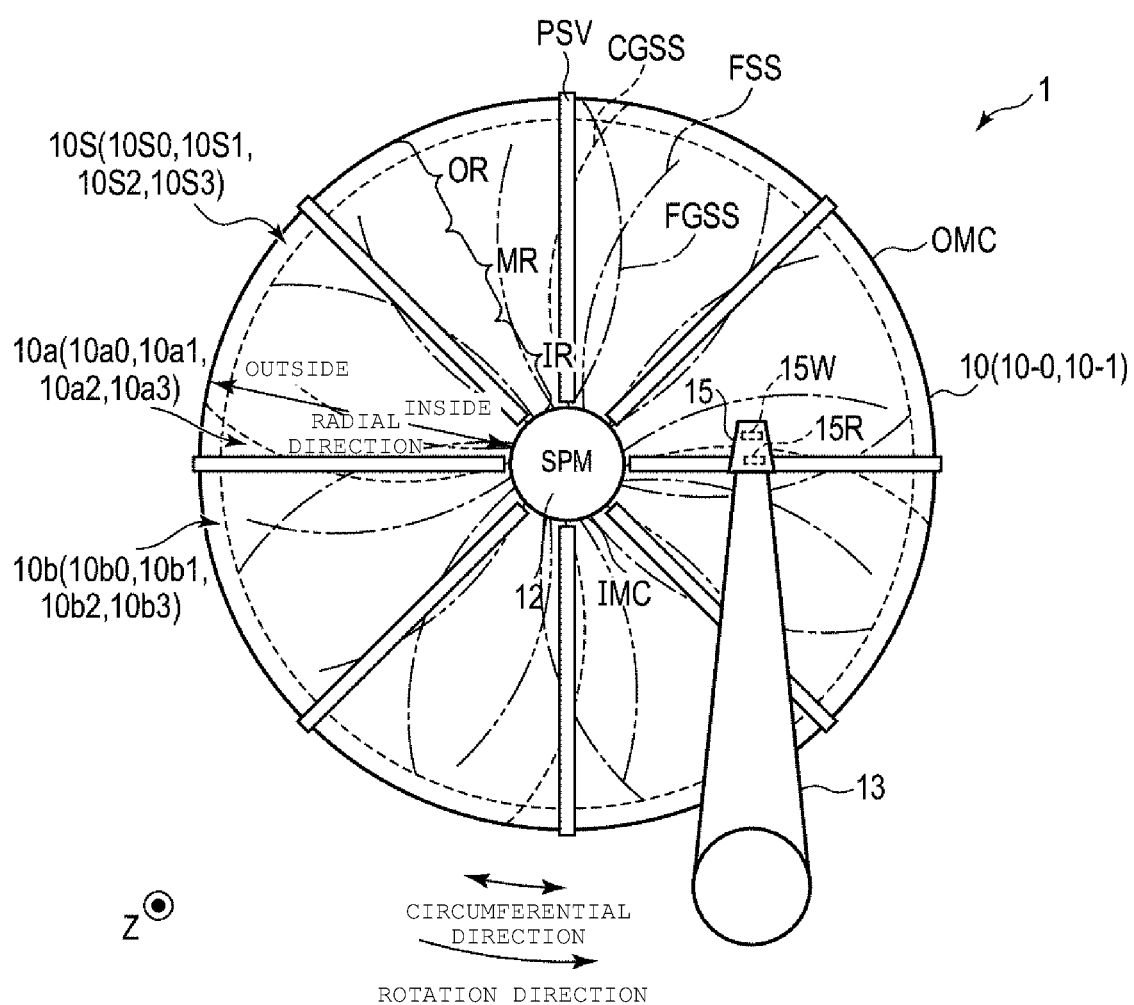
FIG. 3 is a plan view diagram of a virtual surface of a disk including spiral patterns on a plurality of disks.

FIG. 3 is a plan view diagram schematically illustrating an example of a virtual surface of the disk 10 including spiral patterns actually written on a plurality of surfaces of one or more of the disks 10 in the present embodiment. FIG. 3 illustrates one surface 10S (hereafter, may be referred to as virtual surface) of the disk 10 in which spiral patterns written on a plurality of surfaces 10S (10S0, 10S1, 10S2, and 10S3) of the plurality of stacked disks 10 are collectively shown. The virtual surface shows the data and patterns of multiple surfaces that do not actually exist on the same surface. Hereinafter, "the virtual surface of the disk 10" may be referred to as "a virtual surface of a predetermined surface and another surface". FIG. 3 illustrates only the configurations necessary for the description. FIG. 3 illustrates an innermost circumference IMC and an outermost circumference OMC of the disk 10.

The virtual surface 10S of the disk 10 includes a plurality of servo patterns (hereinafter, may be referred to as "product servo area") or a plurality of servo areas PSV (hereinafter, may be referred to as "product servo area") used in a final product, a plurality of final spiral (FS) servo patterns FSS, a plurality of fine guide spiral (FGS) servo patterns FGSS, and a plurality of coarse guide spiral (CGS) servo patterns CGSS. In FIG. 3, the FS servo patterns FSS and the CGS servo patterns CGSS are described as being extended in parallel for convenience, but may not actually be extended in parallel. Since the direction and speed when writing the FS servo patterns FSS, the FGS servo patterns FGSS, and the CGS servo patterns CGSS are freely selected, the FS servo patterns FSS, the FGS servo patterns FGSS, and the CGS servo patterns CGSS are basically not parallel.

In FIG. 3, the product servo pattern PSV is illustrated in a rectangular shape extending linearly in the radial direction. The plurality of product servo patterns PSV extend radially in the radial direction of the disk 10 and are discretely arranged at predetermined intervals in the circumferential direction of the disk 10. The product servo pattern PSV is described as extending linearly from the inside to the outside in the radial direction, but may be bent. For example, the product servo pattern PSV may be spirally arranged from the inside to the outside in the radial direction. Hereinafter, one product servo pattern PSV on a predetermined track may be referred to as "product servo sector". The product servo pattern may be referred to as "product servo sector". The "product servo sector" may also be referred to as "product servo pattern". The product servo sector is used to store product servo data. In addition, "product servo data written in a product servo sector" may be referred to as "product servo sector". In addition, data other than the product servo data written in the user data area 10a other than the product servo sector may be referred to as user data.

The servo sector contains servo data such as preamble, servo mark, gray code, PAD, burst data, and post code. The servo sector (or servo data) may not contain post code. The servo sector (or servo data) may be configured to contain at least one of preamble, servo mark, gray code, PAD, burst data, and post code. Further, the servo sector (or servo data) may be configured to contain data other than preamble, servo mark, gray code, PAD, burst data, and post code. In the servo sector, preamble, servo mark, gray code, PAD, burst data, and post code are disposed consecutively from the front to the back in the circumferential direction in this order. The preamble contains preamble information for synchronizing with a reproduction signal of a servo pattern composed of a servo mark, a gray code, and the like. The servo mark contains servo mark information indicating the start of the servo pattern. The gray code is composed of a predetermined track address (cylinder address) and a predetermined track servo sector address. The burst data is data used for detecting a positional deviation (position error) of the head 15 in the radial direction and/or the circumferential direction with respect to the track center of a predetermined track, and is composed of a repeating pattern having a predetermined cycle. The PAD contains PAD information for synchronization signals such as gap and servo AGC. The burst data is written with a data pattern in which the phase of the burst data is inverted by 180° in one servo track cycle in the radial direction of the disk 10. The servo track (servo cylinder) corresponds to a track to be subjected to write processing or read processing by a command from the host 100 or the like. The burst data is used, for example, to acquire a position (hereinafter, may be referred to as head position) of the head 15 on the disk 10 in the radial direction and/or circumferential direction. The burst data contains, for example, N Burst and Q Burst. The N burst and the Q burst are written with a data pattern that is 90° out of phase with each other in the radial direction of the disk 10. The post code contains the target path (hereinafter, may be referred to as target route) of the head 15 disposed concentrically with the disk 10 caused by the blurring (repeatable runout: RRO) synchronized with the rotation of the disk 10 when the servo data is written on the disk, for example, data (hereinafter, may be referred to as RRO correction data) for correcting an error caused by distortion of the track with respect to the track center. Hereinafter, for convenience of description, the error caused by the distortion of the track with respect to the target path caused by the RRO may be simply referred to as RRO.

In FIG. 3, the FS servo pattern FSS is illustrated by a chain double-dashed line. A plurality of FS servo patterns FSS extend spirally from the inside to the outside in the radial direction of the disk 10, and are discretely arranged at predetermined intervals in the circumferential direction of the disk 10. Hereinafter, one FS servo pattern in a predetermined track may be referred to as "FS servo sector". The FS servo pattern may be referred to as "FS servo sector". The "FS servo sector" may be referred to as "FS servo pattern". The FS servo sector is used to store the corresponding servo data. In addition, "FS servo data corresponding to the FS servo sector written in the FS servo sector" may be referred to as "FS servo sector".

In FIG. 3, the FGS servo pattern FGSS is indicated by a chain single-dashed line. A plurality of FGS servo patterns FGSS extend spirally from the inside to the outside in the radial direction of the disk 10, and are discretely arranged at predetermined intervals in the circumferential direction of the disk 10. For example, a position-controllable stroke of the FGS servo pattern FGSS from the inside to the outside in the radial direction is longer than a position-controllable stroke of the FS servo pattern FSS from the inside to the outside in the radial direction. On one surface of the disk 10, the number of FGS servo patterns FGSS is less than the number of FS servo patterns FSS. The number of FGS servo patterns FGSS on one surface of the disk 10 is, for example, 32. The number of FS servo patterns FSS on one surface of the disk 10 is, for example, 200 to 300. A frequency corresponding to the FGS servo patterns FGSS is different from a frequency corresponding to the FS servo pattern FSSs and a frequency corresponding to the product servo patterns PSV. Hereinafter, one FGS servo pattern in a predetermined track may be referred to as "FGS servo sector". The FGS servo pattern may be referred to as "FGS servo sector". The "FGS servo sector" may also be referred to as "FGS servo pattern". The FGS servo sector is used to store the corresponding servo data. In addition, "FGS servo data corresponding to the FS servo sector written in the FGS servo sector" may be referred to as "FGS servo sector".

In FIG. 3, the CGS servo pattern CGSS is indicated by a dotted line. A plurality of CGS servo patterns CGSS extend spirally from the inside to the outside in the radial direction of the disk 10, and are discretely arranged at predetermined intervals in the circumferential direction of the disk 10. For example, a position-controllable stroke of the CGS servo pattern CGSS from the inside to the outside in the radial direction is longer than the position-controllable stroke of the FGS servo pattern FGSS. On the disk 10, the number of CGS servo patterns CGSS is smaller than the number of FGS servo patterns FGSS. The number of CGS servo patterns CGSS on one surface of the disk 10 is, for example, 10. A frequency corresponding to the CGS servo patterns CGSS is different from the frequency corresponding to the FGS servo patterns FGSS, the frequency corresponding to the FS servo patterns FSS, and the frequency corresponding to the product servo patterns PSV. Hereinafter, one CGS servo pattern CGSS in a predetermined track may be referred to as "CGS servo sector". The CGS servo pattern may be referred to as "CGS servo sector". The "CGS servo sector" may also be referred to as "CGS servo pattern". The CGS servo sector contains the corresponding servo data. In addition, the "servo data corresponding to the CGS servo sector written in a CGS servo sector" may be referred to as "CGS servo sector".

Figure 4:
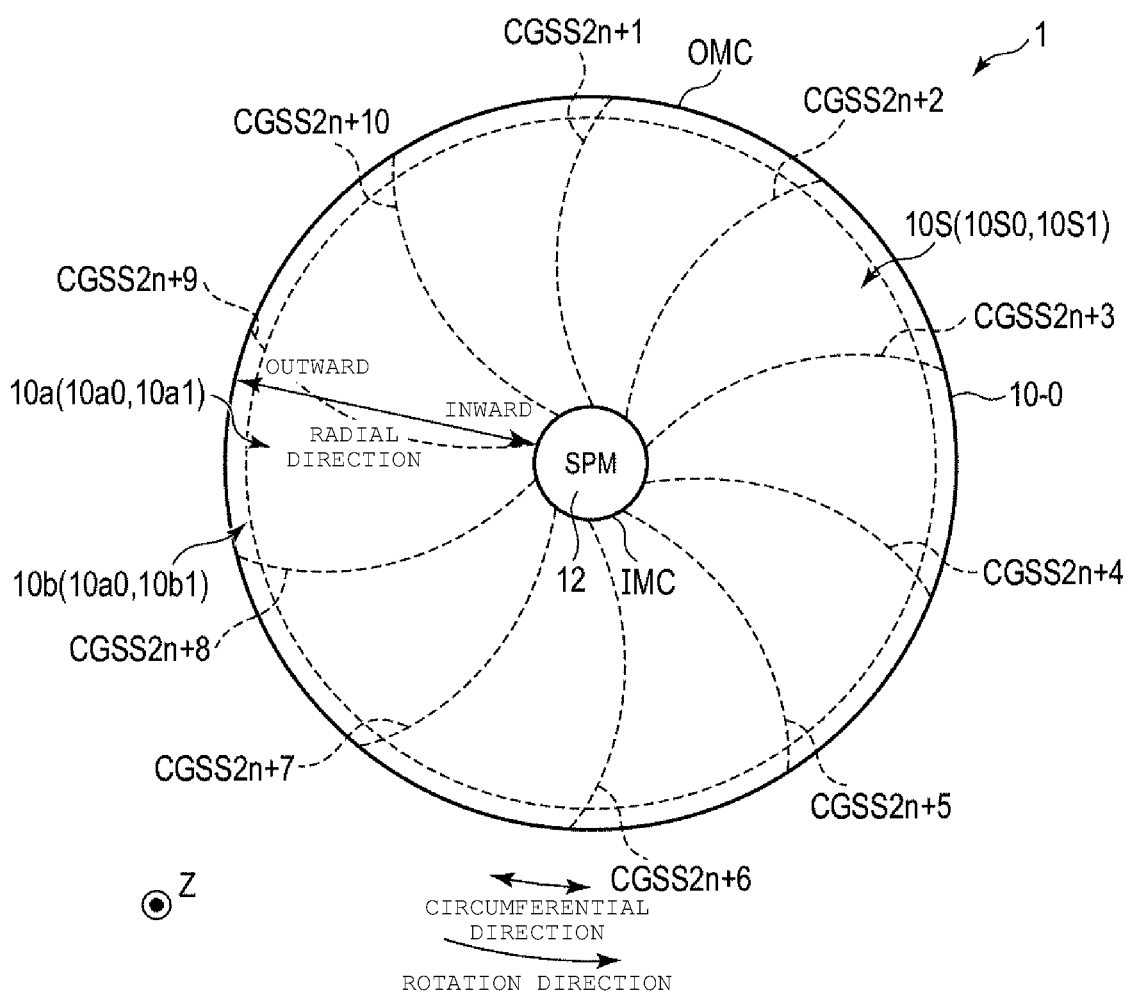
FIG. 4 is a plan view diagram schematically illustrating an example of arrangement of CGS servo patterns on a plurality of surfaces of disks in the first embodiment.

FIG. 4 is a plan view diagram schematically illustrating an example of arrangement of the CGS servo patterns CGSS on the plurality of surfaces 10S in the present embodiment. FIG. 4 illustrates a virtual surface including patterns on the front surface 10S0 and patterns on the back surface 10S1 of the disk 10-0. FIG. 4 illustrates only the configurations necessary for the description. The product servo patterns PSV, the plurality of FS servo patterns FSS, and the plurality of FGS servo patterns FGSS may be arranged on the front surface 10S0 and the back surface 10S1 of the disk 10-0.

The plurality of CGS servo patterns CGSS are arranged on a plurality of surfaces 10S. In the example illustrated in FIG. 4, the plurality of CGS servo patterns CGSS include CGS servo patterns CGSS$2n$+1, CGSS$2n$+2, CGSS$2n$+3, CGSS$2n$+4, CGSS$2n$+5, CGSS$2n$+6, CGSS$2n$+7, CGSS$2n$+8, CGSS$2n$+9, and CGSS$2n$+10. n is an integer greater than or equal to 0. The CGS servo patterns CGSS$2n$+1, CGSS$2n$+2, CGSS$2n$+3, CGSS$2n$+4, CGSS$2n$+5, CGSS$2n$+6, CGSS$2n$+7, CGSS$2n$+8, CGSS$2n$+9, and CGSS$2n$+10 are arranged in the order described in the clockwise direction (rotation to the right) in the circumferential direction. Hereinafter, predetermined CGS servo patterns CGSS, for example, the odd-numbered CGS servo patterns CGSS$2n$+1, CGSS$2n$+3, CGSS$2n$+5, CGSS$2n$+7, and CGSS$2n$+9 counting clockwise (rotation to the right) in the circumferential direction from the CGS servo pattern CGSS$2n$+1 may be referred to as "odd CGS servo patterns". Predetermined CGS servo patterns CGSS, for example, the even-numbered CGS servo patterns CGSS$2n$+2, CGSS$2n$+4, CGSS$2n$+6, CGSS$2n$+8, and CGSS$2n$+10 counting clockwise (rotation to the right) in the circumferential direction from the CGS servo pattern CGSS$2n$+1 may be referred to as "even CGS servo patterns".

The plurality of CGS servo patterns CGSS$2n$+1 to CGSS$2n$+10 are arranged on the front surface 10S0 and the back surface 10S1 of the disk 10-0. In a plan view, the CGS servo patterns CGSS$2n$+1, CGSS$2n$+2, CGSS$2n$+3, CGSS$2n$+4, CGSS$2n$+5, CGSS$2n$+6, CGSS$2n$+7, CGSS$2n$+8, CGSS$2n$+9, and CGSS$2n$+10 are arranged at intervals in the order described in the clockwise direction (rotation to the right) in the circumferential direction. In a plan view, the plurality of CGS servo patterns CGSS$2n$+1 to CGSS$2n$+10 do not overlap at the innermost circumference IMC and at the outermost circumference OMC. For example, in a plan view, the plurality of CGS servo patterns CGSS$2n$+1 to CGSS$2n$+10 may be arranged at equal intervals in the innermost circumference IMC. Alternatively, inn a plan view, the plurality of CGS servo patterns CGSS$2n$+1 to CGSS$2n$+10 may not be arranged at equal intervals in the innermost circumference IMC. The plurality of CGS servo patterns CGSS$2n$+1 to CGSS$2n$+10 may be arranged on three or more surfaces of the disks 10. The plurality of CGS servo patterns CGSS$2n$+1 to CGSS$2n$+10 may be similarly arranged on the front surface 10S0 and the back surface 10S1 of the disk 10-0 and on the front surface 10S2 and the back surface 10S3 of the disk 10-1, respectively. Further, the plurality of CGS servo patterns CGSS$2n$+1 to CGSS$2n$+10 may be arranged on at least two of the front surface 10S0, the back surface 10S1, the front surface 10S2, and the back surface 10S3.

Figure 5:
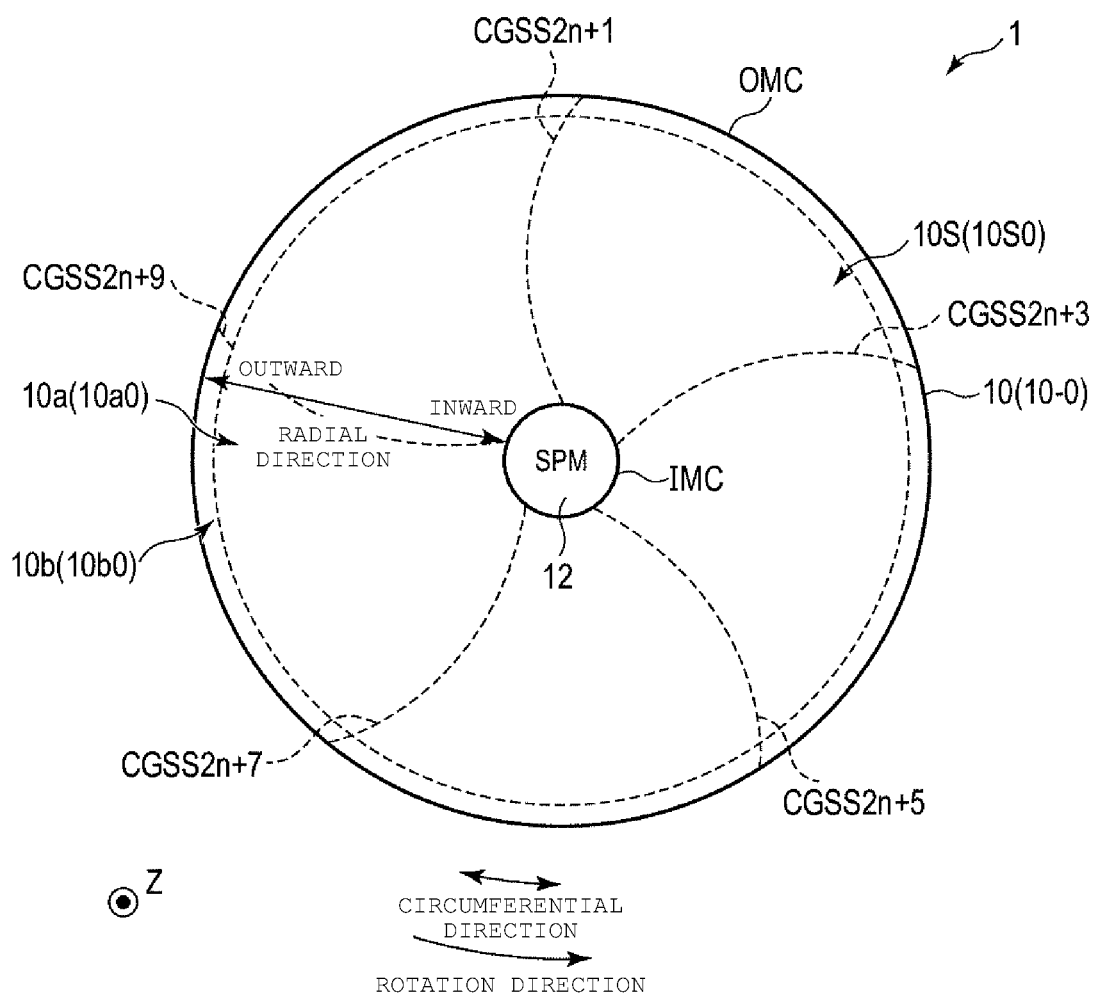
FIG. 5 is a plan view diagram schematically illustrating an example of arrangement of the CGS servo patterns on a surface of a disk in the first embodiment.

FIG. 5 is a plan view diagram schematically illustrating an example of the arrangement of the CGS servo patterns CGSS on the surface 10S0 in the present embodiment. FIG. 5 illustrates only the configurations necessary for the description.

In the example illustrated in FIG. 5, the odd-numbered CGS servo patterns CGSS$2n$+1, CGSS$2n$+3, CGSS$2n$+5, CGSS$2n$+7, and CGSS$2n$+9 are arranged in the order described in the clockwise direction (rotation to the right) in the circumferential direction on the front surface 10S0 of the disk 10-0. For example, the odd-numbered CGS servo patterns CGSS$2n$+1, CGSS$2n$+3, CGSS$2n$+5, CGSS$2n$+7, and CGSS$2n$+9 are arranged from the innermost circumference IMC to the outermost circumference OMC. Alternatively, the odd-numbered CGS servo patterns CGSS$2n$+1, CGSS$2n$+3, CGSS$2n$+5, CGSS$2n$+7, and CGSS$2n$+9 may not be arranged from the innermost circumference IMC to the outermost circumference OMC. Further, the odd-numbered CGS servo patterns CGSS$2n$+1, CGSS$2n$+3, CGSS$2n$+5, CGSS$2n$+7, and CGSS$2n$+9 may be arranged on at least one of the back surface 10S1, the front surface 10S2, and the back surface 10S3.

Figure 6:
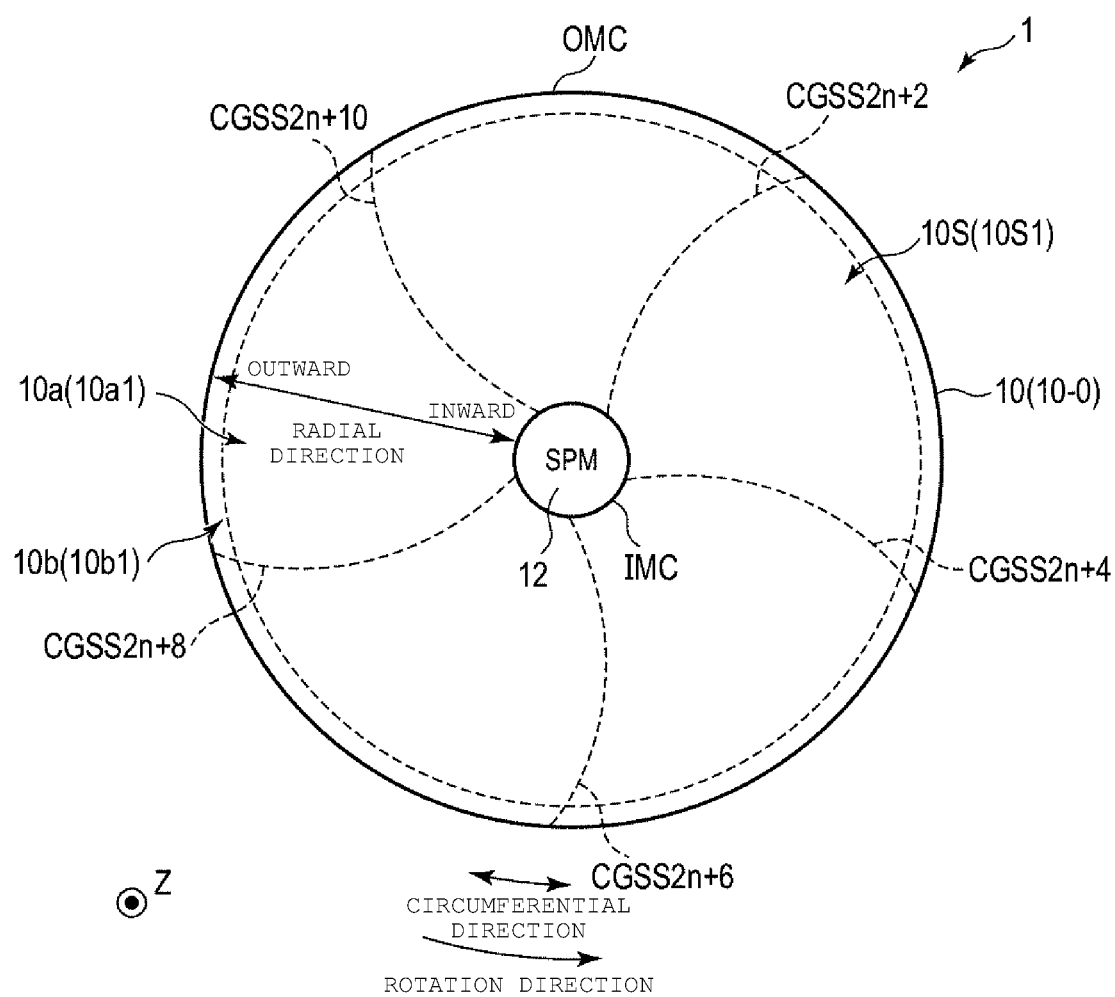
FIG. 6 is a plan view diagram schematically illustrating an example of arrangement of the CGS servo patterns on another surface of the disk in the first embodiment.

FIG. 6 is a plan view diagram schematically illustrating an example of the arrangement of the CGS servo patterns CGSS on the surface 10S1 in the present embodiment. FIG. 6 illustrates only the configurations necessary for the description.

In the example illustrated in FIG. 6, even-numbered CGS servo patterns CGSS$2n$+2, CGSS$2n$+4, CGSS$2n$+6, CGSS$2n$+8, and CGSS$2n$+10 are arranged in the order described in the clockwise direction (rotation to the right) in the circumferential direction on the front surface 10S1 of the disk 10-0. In a plan view, the even-numbered CGS servo patterns CGSS$2n$+2, CGSS$2n$+4, CGSS$2n$+6, CGSS$2n$+8, and CGSS$2n$+10 are arranged so as not to overlap the odd-numbered CGS servo patterns CGSS$2n$+1, CGSS$2n$+3, CGSS$2n$+5, CGSS$2n$+7, and CGSS$2n$+9, respectively. For example, the even-numbered CGS servo patterns CGSS$2n$+2, CGSS$2n$+4, CGSS$2n$+6, CGSS$2n$+8, and CGSS$2n$+10 are arranged from the innermost circumference IMC to the outermost circumference OMC. Alternatively, the even-numbered CGS servo patterns CGSS$2n$+2, CGSS$2n$+4, CGSS$2n$+6, CGSS$2n$+8, and CGSS$2n$+10 may not be arranged from the innermost circumference IMC to the outermost circumference OMC. Further, the even-numbered CGS servo patterns CGSS$2n$+2, CGSS$2n$+4, CGSS$2n$+6, CGSS$2n$+8, and CGSS$2n$+10 may be arranged on at least one of the back surface 10S1, the front surface 10S2, and the back surface 10S3.

Figure 7:
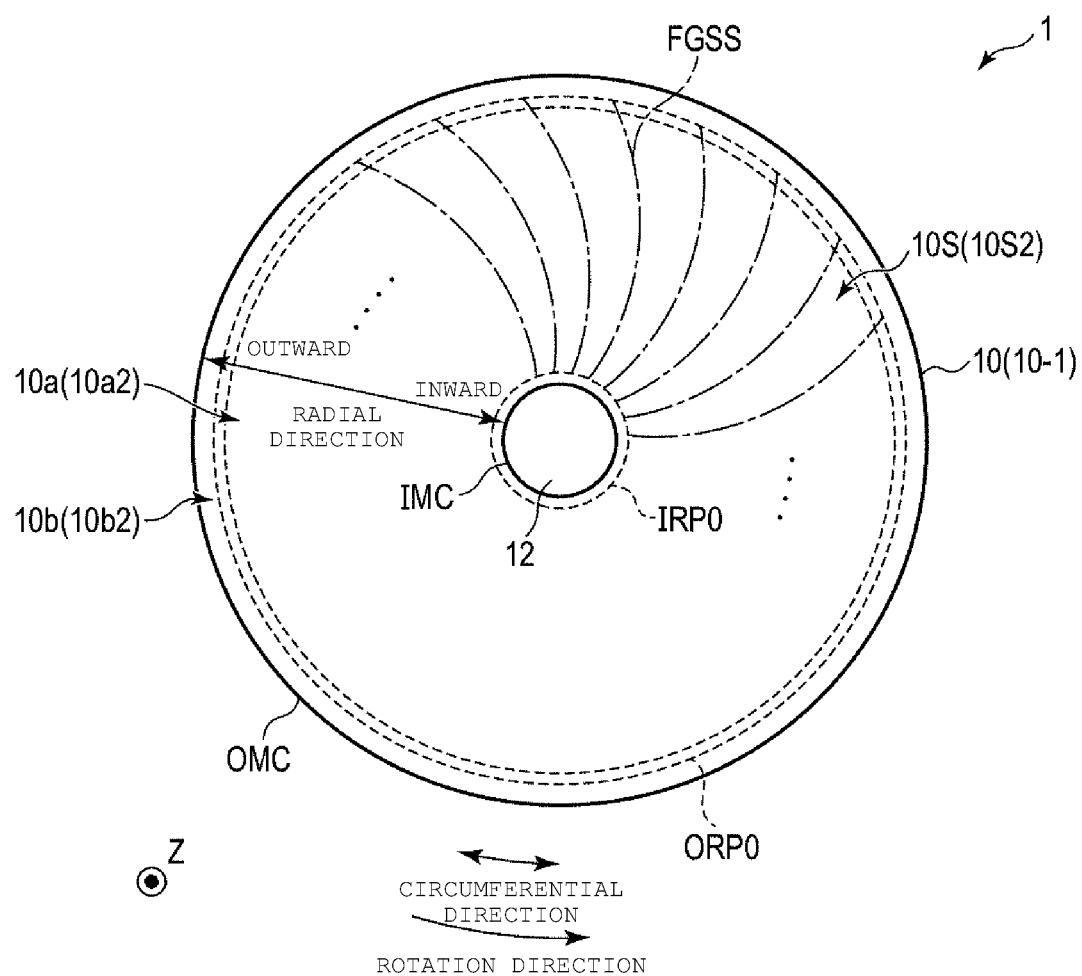
FIG. 7 is a plan view diagram schematically illustrating an example of arrangement of FGS servo patterns on a surface of a disk in the first embodiment.

FIG. 7 is a plan view diagram schematically illustrating an example of the arrangement of the FGS servo patterns FGSS on the surface 10S1 in the present embodiment. FIG. 7 illustrates the front surface 10S2 of the disk 10-1 viewed from above in the height direction Z. FIG. 7 illustrates a radial position ORP0 located inside the outermost circumference OMC and a radial position IRP0 located between the radial position ORP0 and the innermost circumference IMC. FIG. 7 illustrates only the configurations necessary for the description. Although not illustrated, the product servo patterns PSV and the plurality of FS servo patterns FSS may be arranged on the front surface 10S2 of the disk 10-1.

In the example illustrated in FIG. 7, the plurality of FGS servo patterns FGSS are arranged on the front surface 10S2 of the disk 10-1. For example, a plurality of FGS servo patterns FGSS are arranged from the radial position IRP0 to the radial position ORP0. Alternatively, the plurality of FGS servo patterns FGSS may be arranged from the innermost circumference IMC to the outermost circumference OMC. Further, the plurality of FGS servo patterns FGSS may be arranged on at least one of the back surface 10S1, the front surface 10S2, and the back surface 10S3.

Figure 8:
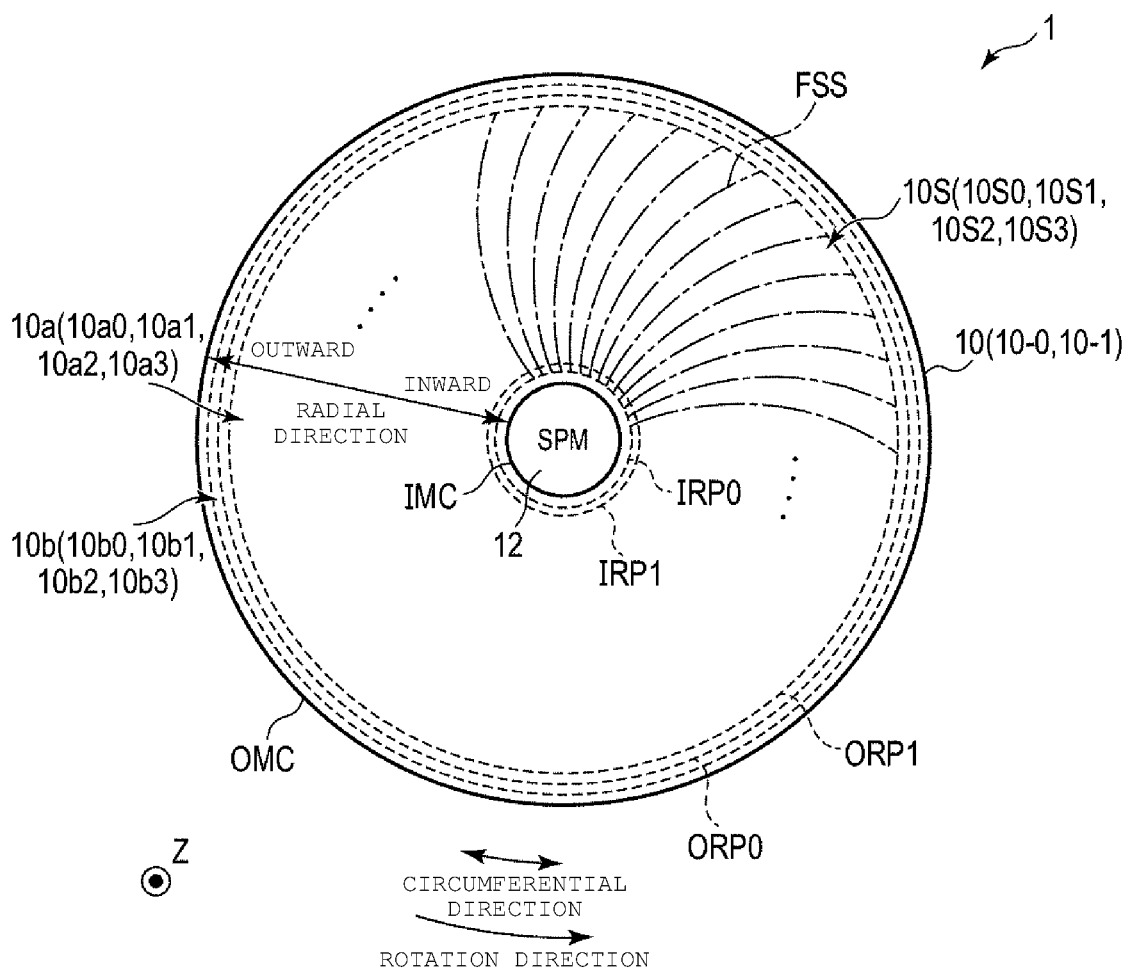
FIG. 8 is a plan view diagram schematically illustrating an example of arrangement of FS servo patterns on each surface of disks in the first embodiment.

FIG. 8 is a plan view diagram schematically illustrating an example of the arrangement of the FS servo patterns FSS on each of the surfaces 10S0, 10S1, 10S2, and 10S3 in the present embodiment. FIG. 8 illustrates a surface of the disk 10 viewed from above in the height direction Z. FIG. 8 illustrates a radial position ORP1 located inside the radial position ORP0 and a radial position IRP1 located between the radial position ORP1 and the radial position IRP0. FIG. 8 illustrates only the configurations necessary for the description. Although not illustrated, the product servo patterns PSV may be arranged on the front surface 10S0, the back surface 10S1, the front surface 10S2, and the back surface 10S3 of the disks 10-0 and 10-1.

In the example illustrated in FIG. 8, the plurality of FS servo patterns FSS are arranged on each of the front surface 10S0, the back surface 10S1, the front surface 10S2, and the back surface 10S3 of the disks 10-0 and 10-1. For example, the plurality of FS servo patterns FSS are arranged from the radial position IRP1 to the radial position ORP1. Alternatively, the plurality of FS servo patterns FSS may be arranged from the innermost circumference IMC to the outermost circumference OMC. Further, the plurality of FS servo patterns FSS may be arranged on at least one of the front surface 10S0, the back surface 10S1, the front surface 10S2, and the back surface 10S3.

The driver IC 20 is connected to the system controller 130 (specifically, MPU 60 described below), the SPM 12, and the VCM 14, and controls the driving of the SPM 12 and VCM 14 according to the control of the system controller 130 (specifically, MPU 60).

The head amplifier IC (preamplifier) 30 includes a read amplifier (not illustrated) and a write driver. The read amplifier amplifies a read signal read from the disk 10 and outputs the amplified signal to the system controller 130 (more specifically, a read/write (R/W) channel 40 described below). The write driver outputs a write current corresponding to the signal output from the R/W channel 40 to the head 15.

The volatile memory 70 is a semiconductor memory in which stored data is lost when power supply is cut off. The volatile memory 70 stores data and the like necessary for processing in each part of the magnetic disk device 1. The volatile memory 70 is, for example, dynamic random access memory (DRAM) or synchronous dynamic random access memory (SDRAM).

The nonvolatile memory 80 is a semiconductor memory that stores data even when the power supply is cut off. The nonvolatile memory 80 is, for example, a NOR type or NAND type flash ROM (Flash Read Only Memory: FROM).

The buffer memory 90 is a semiconductor memory that temporarily stores data and the like transmitted and received between the magnetic disk device 1 and the host 100. The buffer memory 90 may be integrated with the volatile memory 70. The buffer memory 90 is, for example, DRAM, static random access memory (SRAM), SDRAM, ferroelectric random access memory (FeRAM), magnetoresistive random access memory (MRAM), or the like.

The system controller (controller) 130 is implemented by using a large scale integrated circuit (LSI) called system-on-a-chip (SoC), in which a plurality of elements are integrated on a single chip, for example. The system controller 130 includes a read/write (R/W) channel 40, a hard disk controller (HDC) 50, and a microprocessor (MPU) 60. The R/W channels 40, the HDC 50, and the MPU 60 are electrically connected to each other. The system controller 130 is electrically connected to, for example, the driver IC 20, the head amplifier IC 60, the volatile memory 70, the nonvolatile memory 80, the buffer memory 90, the host system 100, and the like.

The R/W channel 40 executes signal processing of data transferred from the disk 10 to the host 100, for example, read data, and data transferred from the host 100, in response to an instruction from the MPU 60. The R/W channel 40 is electrically connected to, for example, the head amplifier IC 30, the HDC 50, the MPU 60, and the like. The R/W channel 40 includes a circuit or a function of modulating write data. Further, the R/W channel 40 includes a circuit or function for measuring the signal quality of the read data and a circuit or function for decoding the read data.

The HDC 50 controls data transfer between the host 100 and the R/W channel 40 in response to an instruction from the MPU 60. The HDC 50 is electrically connected to, for example, the R/W channel 40, the MPU 60, the volatile memory 70, the nonvolatile memory 80, the buffer memory 90, and the like.

The MPU 60 is a main controller that controls each part of the magnetic disk device 1. The MPU 60 controls the VCM 14 via the driver IC 20 and executes servo control for positioning the head 15. The MPU 60 controls the operation of writing data to the disk 10 and selects the storage destination of the data transferred from the host 100, for example, write data. The MPU 60 controls the read operation of the data from the disk 10 and also controls the processing of the data transferred from the disk 10 to the host 100, for example, the read data. The MPU 60 also manages an area for storing data. The MPU 60 is connected to each part of the magnetic disk device 1. The MPU 60 is electrically connected to the driver IC 20, the R/W channel 40, the HDC 50, and the like, for example.

The MPU 60 includes a read/write control unit 610, a CGS servo pattern control unit 620, a measurement unit 630, a servo pattern control unit 640, and a positioning control unit 650. The MPU 60 executes the processing of each of these units, for example, the read/write control unit 610, the CGS servo pattern control unit 620, the measurement unit 630, the servo pattern control unit 640, and the positioning control unit 650 on the firmware. The MPU 60 may include each of these units, for example, the read/write control unit 610, the CGS servo pattern control unit 620, the measurement unit 630, the servo pattern control unit 640, the positioning control unit 650, and the like as a circuit.

The read/write control unit 610 controls data read processing and write processing according to a command or the like from the host 100. The read/write control unit 610 controls the VCM 14 via the driver IC 20, locates the head 15 at a predetermined radial position on the disk 10, and executes the read processing or the write processing. Hereinafter, "write processing" and "read processing" may be collectively expressed by the term "access" or "access processing".

The CGS servo pattern control unit 620 writes the CGS servo patterns CGSS on the disk 10. The CGS servo pattern control unit 620 executes stroke calibration on the disk 10 and writes the CGS servo patterns CGSS on the disk 10 as a first step of blank disk writing (BDW) (or blank disk servo write) to write the CGS servo patterns CGSS, the FGS servo patterns FGSS, and the FS servo patterns FSS in order on the disk 10 on which no data and patterns are written (hereinafter, may be referred to as blank state). Since the CGS servo pattern control unit 620 cannot read data, patterns, and the like on the blank disk 10, the CGS servo pattern control unit 620 does not execute read processing (or on-track), controls the head 15 at a constant speed according to velocity information (hereinafter, may be referred to as "back electromotive force (back-EMF) speed information") of the head 15 with respect to the disk 10 based on a counter electromotive voltage generated from the VCM 14 to write the CGS servo patterns CGSS on the disk 10 toward the inside in the radial direction, for example, the innermost circumference IMC, from, for example, the outermost circumference OMC, starting from a position of the disk 10 (hereinafter, may be referred to as "clock-based position") corresponding to one round of a reference clock per lap of the blank disk 10. Alternatively, the CGS servo pattern control unit 620 may control the head 15 at a constant speed according to the back-EMF speed information to write the CGS servo patterns CGSS on the disk 10 toward the outside in the radial direction, for example, the outermost circumference OMC, from, for example, the innermost circumference IMC, starting from the clock-based position of the blank disk 10.

The CGS servo pattern control unit 620 writes a plurality of CGS servo patterns CGSS in a distributed manner on a plurality of surfaces of one or more disks 10. For example, the plurality of CGS servo patterns CGSS are those that are supposed to be written originally on one surface of a conventional disk. "Writing the plurality of CGS servo patterns on a plurality of surfaces in a distributed manner" means "writing some of the plurality of CGS servo patterns on one surface from the inner circumference to the outer circumference of the disk 10 or from the outer circumference to the inner circumference in one stroke or continuously, and writing other CGS servo patterns of these CGS servo patterns at intervals on other surfaces different from the above-mentioned one surface in the circumferential direction". For example, "writing four CGS servo patterns on two surfaces" means "writing at least one of the four CGS servo patterns on one of the two surfaces and writing the remaining CGS servo patterns of the four CGS servo patterns on the other of the two surfaces". For example, the CGS servo pattern control unit 620 writes these CGS servo patterns CGSS on the plurality of surfaces of the disk 10 in a distributed manner to prevent two CGS servo patterns CGSS adjacent to each other in the circumferential direction among the plurality of CGS servo patterns CGSS arranged in the circumferential direction on the virtual surface of the disk 10 from being disposed on the same surface. Here, "adjacent" means not only that data, objects, areas, spaces, and the like are disposed in contact with each other, but also that data, objects, areas, spaces, and the like are disposed with a predetermined interval, a predetermined space, or a predetermined object in between. In addition, "adjacent on a virtual surface" may be referred to as "virtually adjacent". When a predetermined CGS servo pattern CGSS of the plurality of CGS servo patterns CGSS is written on a predetermined surface of the disk 10, the CGS servo pattern control unit 620 writes a CGS servo pattern CGSS (hereinafter, may be referred to as "the next CGS servo pattern") which is continuous with this predetermined CGS servo pattern CGSS and is to be written next, on a surface different from the predetermined surface of the disk 10 on which this predetermined CGS servo pattern CGSS has been written. In other words, the CGS servo pattern control unit 620 writes the CGS servo pattern CGSS in the area of the surface different from this predetermined surface corresponding to the area corresponding to the area between two CGS servo patterns CGSS adjacent in the circumferential direction on the predetermined surface.

The CGS servo pattern control unit 620 executes calibration for writing the plurality of CGS servo pattern CGSS, and switches between the plurality of heads 15 corresponding to the plurality of surfaces to write the plurality of CGS servo patterns CGSS on the plurality of surfaces 10S of the disk 10. In other words, the CGS servo pattern control unit 620 performs the calibration for writing the plurality of CGS servo patterns CGSS, and switches between the assertion (active, enabled, or ON) and negation (inactive, disabled, or OFF) of the write gate of the plurality of heads 15 corresponding to the plurality of surfaces 10S of the disk 10 to write the plurality of CGS servo patterns CGSS on the plurality of surfaces 10S in a distributed manner. The data composition and frequency of the plurality of CGS servo patterns CGSS written on the plurality of surfaces 10S of the disk 10 in the distributed manner are the same. Terms such as "same", "identical", "match", and "equivalent" include the meaning of being exactly the same, as well as the meaning of being different to the extent that the terms may be considered to be substantially the same.

For example, the CGS servo pattern control unit 620 alternately writes the odd-numbered CGS servo patterns CGSS$2n+1$ to CGSS$2n+9$ and the even-numbered CGS servo patterns CGSS$2n+2$ to CGSS$2n+10$ of the plurality of CGS servo patterns CGSS on the front surface 10S0 of the disk 10-0 and the back surface 10S1 of the disk 10-0, respectively, while switching between the head 15-0 and the head 15-1. The CGS servo pattern control unit 620 writes the odd-numbered CGS servo patterns CGSS$2n+1$ to CGSS$2n+9$ CGSS on the front surface 10S0 of the disk 10-0 with the head 15-0, and writes the even-numbered CGS servo patterns CGSS$2n+2$ to CGSS$2n+10$ on the back surface 10S1 of the disk 10-0 with the head 15-1. The CGS servo pattern control unit 620 asserts the write gate at the head 15-0 and negates the write gate at the head 15-1 to write the odd-numbered CGS servo patterns CGSS$2n+1$ to CGSS$2n+9$ on the front surface 10S0 of the disk 10-0 with the head 15-0, and negates the write gate at the head 15-1 and asserts the write gate at the head 15-1 to write the even-numbered CGS servo patterns CGSS$2n+2$ to CGSS$2n+10$ on the front surface 10S1 of the disk 10-0 with the head 15-1.

Alternatively, the CGS servo pattern control unit 620 may write the odd-numbered CGS servo patterns CGSS$2n+1$ to CGSS$2n+9$ on the back surface 10S1 of the disk 10-0, the front surface 10S2 of the disk 10-1, or the back surface 10S3 of the disk 10-1, and write the even-numbered CGS servo patterns CGSS$2n+2$ to CGSS$2n+10$ on the back surface 10S0 of the disk 10-0, the front surface 10S2 of the disk 10-1, or the back surface 10S3 of the disk 10-1 on which the odd-numbered CGS servo patterns CGSS$2n+1$ to CGSS$2n+9$ are not written. Further, the CGS servo pattern control unit 620 may write the odd-numbered CGS servo patterns CGSS$2n+1$ to CGSS$2n+9$ on the front surface 10S0 of the disk 10-0 and the front surface 10S2 of the disk 10-1, respectively and write the even-numbered CGS servo patterns CGSS$2n+2$ to CGSS$2n+10$ on the back surface 10S1 of the disk 10-0 and the back surface 10S3 of the disk 10-1, respectively.

The CGS servo pattern control unit 620 executes calibration for writing the plurality of CGS servo patterns CGSS, and switches the plurality of heads 15 corresponding to the plurality of surfaces 10S to write the plurality of CGS servo patterns CGSS on the plurality of surfaces 10S. In other words, the CGS servo pattern control unit 620 performs the calibration for writing the plurality of CGS servo patterns CGSS, and switches between the assertion (active, enabled, or ON) and negation (inactive, disabled, or OFF) of a write gate of the plurality of heads 15 corresponding to the plurality of surfaces 10S to write the plurality of CGS servo patterns CGSS on the plurality of surfaces in a distributed manner.

For example, when the odd-numbered CGS servo patterns CGSS$2n+1$ to CGSS$2n+9$ are written on the front surface 10S0 and the even-numbered CGS servo patterns CGSS$2n+2$ to CGSS$2n+10$ are written on the back surface 10S1, the CGS servo pattern control unit 620 alternately reads the odd-numbered CGS servo patterns CGSS$2n+1$ to CGSS$2n+9$ and the even-numbered CGS servo patterns CGSS$2n+2$ to CGSS$2n+10$ from the front surface 10S0 of the disk 10-0 and the back surface 10S1 of the disk 10-0 while switching between the head 15-0 and the head 15-1. The CGS servo pattern control unit 620 reads the odd-numbered CGS servo patterns CGSS$2n+1$ to CGSS$2n+9$ from the front surface 10S0 of the disk 10-0 with the head 15-0, and reads the even-numbered CGS servo patterns CGSS$2n+2$ to CGSS$2n+10$ from the back surface 10S1 with the head 15-1. The CGS servo pattern control unit 620 asserts the read gate of the head 15-0 and negates the read gate of the head 15-1 to read the odd-numbered CGS servo patterns CGSS$2n+1$ to CGSS$2n+9$ from the front surface 10S0 with the head 15-0, and negates the read gate of the head 15-1 and asserts the read gate of the head 15-1 to read the even-numbered CGS servo patterns CGSS$2n+2$ to CGSS$2n+10$ from the front surface 10S1 with the head 15-1.

Figure 9:
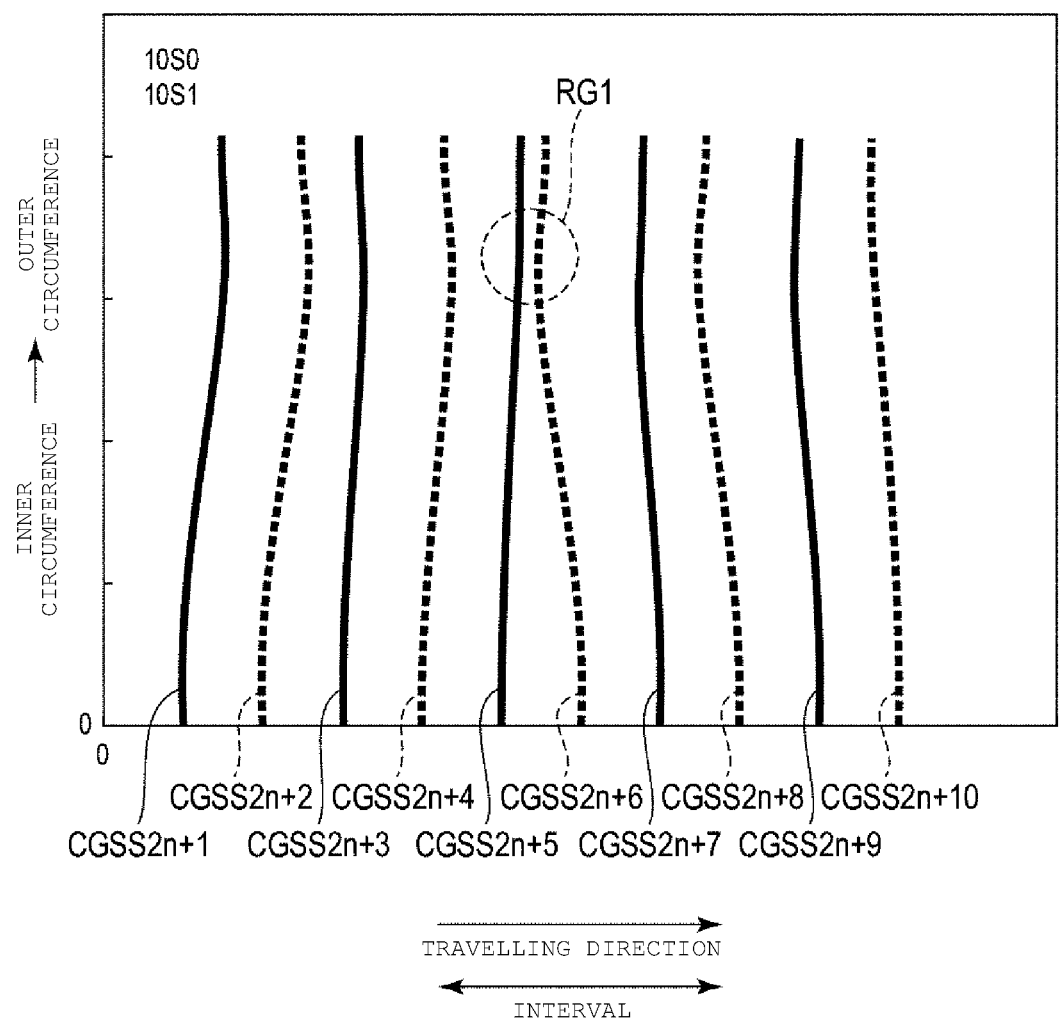
FIG. 9 is a schematic diagram illustrating an example of arrangement of the CGS servo patterns in the first embodiment.

FIG. 9 is a schematic diagram illustrating an example of the arrangement of the CGS servo pattern CGSS in the present embodiment. In FIG. 9, the vertical axis indicates the spiral direction from the inner circumference to the outer circumference, and the horizontal axis indicates the interval (hereinafter, may be simply referred to as interval) when the inner circumference of one of the plurality of CGS servo patterns is used as a reference. FIG. 9 illustrates a traveling direction of the head 15. The direction in which the head 15 sequentially writes and reads data with respect to the disk 10, that is, the direction in which the head 15 travels with respect to the disk 10 may be referred to as a "traveling direction". FIG. 9 corresponds to FIG. 4. FIG. 9 illustrates the CGS servo patterns CGSS$2n+1$ to CGSS$2n+10$ that are continuously arranged in the traveling direction on the virtual surface.

In the example illustrated in FIG. 9, the CGS servo pattern control unit 620 alternately writes the odd-numbered CGS servo patterns CGSS$2n+1$ to CGSS$2n+9$ and the even-numbered CGS servo patterns CGSS$2n+2$ to CGSS$2n+10$ on the front surface 10S0 of the disk 10-0 and the back surface 10S1 of the disk 10-0, respectively, while switching between the head 15-0 and the head 15-1. The CGS servo pattern control unit 620 writes the odd-numbered CGS servo pattern CGSS$2n+1$ on the front surface 10S0 from the inside to the outside with the head 15-0 based on the back-EMF speed information, and switches from the head 15-0 to the head 15-1 to write the even-numbered CGS servo pattern CGSS2$n$+2 on the back surface 10S1 from the inside to the outside with the head 15-1 based on the back-EMF speed information, starting from the clock-based position. The CGS servo pattern control unit 620 writes the odd-numbered CGS servo pattern CGSS2$n$+3 on the front surface 10S0 with the head 15-0 from the inside to the outside based on the back-EMF speed information, and switches from the head 15-0 to the head 15-1 to write the even-numbered CGS servo pattern CGSS2$n$+4 on the back surface 10S1 with the head 15-1 from the inside to the outside based on the back-EMF speed information. The CGS servo pattern control unit 620 writes the odd-numbered CGS servo pattern CGSS2$n$+5 on the front surface 10S0 with the head 15-0 from the inside to the outside based on the back-EMF speed information, and switches from the head 15-0 to the head 15-1 to write the even-numbered CGS servo pattern CGSS2$n$+6 on the back surface 10S1 with the head 15-1 from the inside to the outside based on the back-EMF speed information. The CGS servo pattern control unit 620 writes the odd-numbered CGS servo pattern CGSS2$n$+7 on the front surface 10S0 with the head 15-0 from the inside to the outside based on the back-EMF speed information, and switches from the head 15-0 to the head 15-1 to write the even-numbered CGS servo pattern CGSS2$n$+8 on the back surface 10S1 with the head 15-1 from the inside to the outside based on the back-EMF speed information. The CGS servo pattern control unit 620 writes the odd-numbered CGS servo pattern CGSS2$n$+9 on the front surface 10S0 with the head 15-0 from the inside to the outside based on the back-EMF speed information, and switches from the head 15-0 to the head 15-1 to write the even-numbered CGS servo pattern CGSS2$n$+10 on the back surface 10S1 with the head 15-1 from the inside to the outside based on the back-EMF speed information. In the example illustrated in FIG. 9, the CGS servo pattern CGSS2$n$+5 and the CGS servo pattern CGSS2$n$+6 are close to each other in an area RG1 of the virtual surface of the front surface 10S0 and the back surface 10S1 of the disk 10-0. That is, when the CGS servo pattern CGSS2$n$+5 and the CGS servo pattern CGSS2$n$+6 are read by switching between the head 15-0 and the head 15-1 in the area RG1, the time interval to read may be close.

Figure 10:
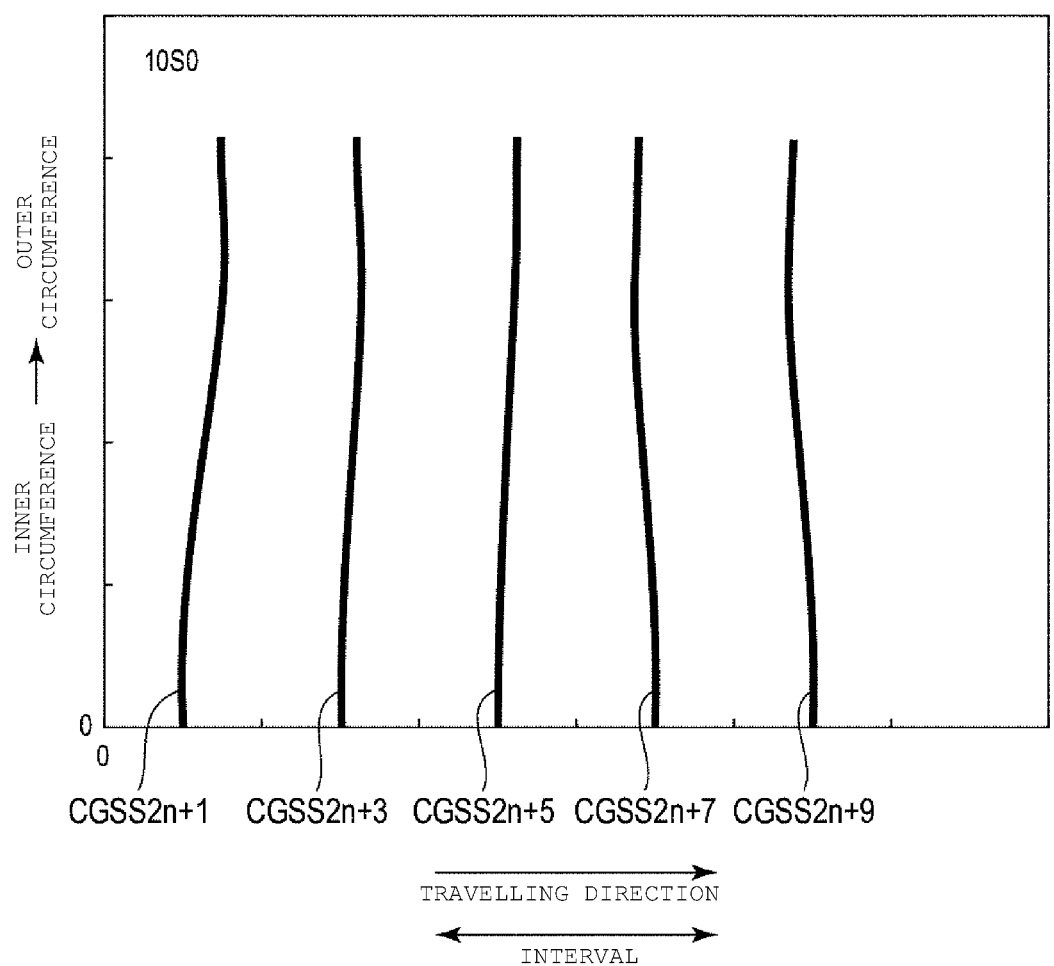
FIG. 10 is a schematic diagram illustrating an example of arrangement of a part of the CGS servo patterns in the first embodiment.

FIG. 10 is a schematic diagram illustrating an example of the arrangement of the CGS servo patterns CGSS on a surface of a disk in the present embodiment. In FIG. 10, the vertical axis illustrates the spiral direction from the inner circumference to the outer circumference, and the horizontal axis illustrates the interval when one of the plurality of CGS servo patterns is used as a reference. FIG. 10 corresponds to FIG. 5. FIG. 10 illustrates the CGS servo patterns CGSS2$n$+1 to CGSS2$n$+9 arranged in the traveling direction on the front surface 10S0 in a plan view.

In the example illustrated in FIG. 10, the CGS servo pattern control unit 620 writes the odd-numbered CGS servo patterns CGSS2$n$+1 to CGSS2$n$+9 on the front surface 10S0 of the disk 10-0 with the head 15-0 from the inner circumference to the outer circumference while switching between the head 15-0 and the head 15-1. The CGS servo pattern control unit 620 writes the odd-numbered CGS servo pattern CGSS2$n$+1 on the front surface 10S0 with the head 15-0 from the inside to the outside based on the back-EMF speed information, starting from the clock reference position. The CGS servo pattern control unit 620 writes the odd-numbered CGS servo pattern CGSS2$n$+3 on the front surface 10S0 with the head 15-0 from the inside to the outside based on the back-EMF speed information. The CGS servo pattern control unit 620 writes the odd-numbered CGS servo pattern CGSS2$n$+5 on the front surface 10S0 with the head 15-0 from the inside to the outside based on the back-EMF speed information. The CGS servo pattern control unit 620 writes the odd-numbered CGS servo pattern CGSS2$n$+7 on the front surface 10S0 with the head 15-0 from the inside to the outside based on the back-EMF speed information. The CGS servo pattern control unit 620 writes the odd-numbered CGS servo pattern CGSS2$n$+9 on the front surface 10S0 with the head 15-0 from the inside to the outside based on the back-EMF speed information.

Figure 11:
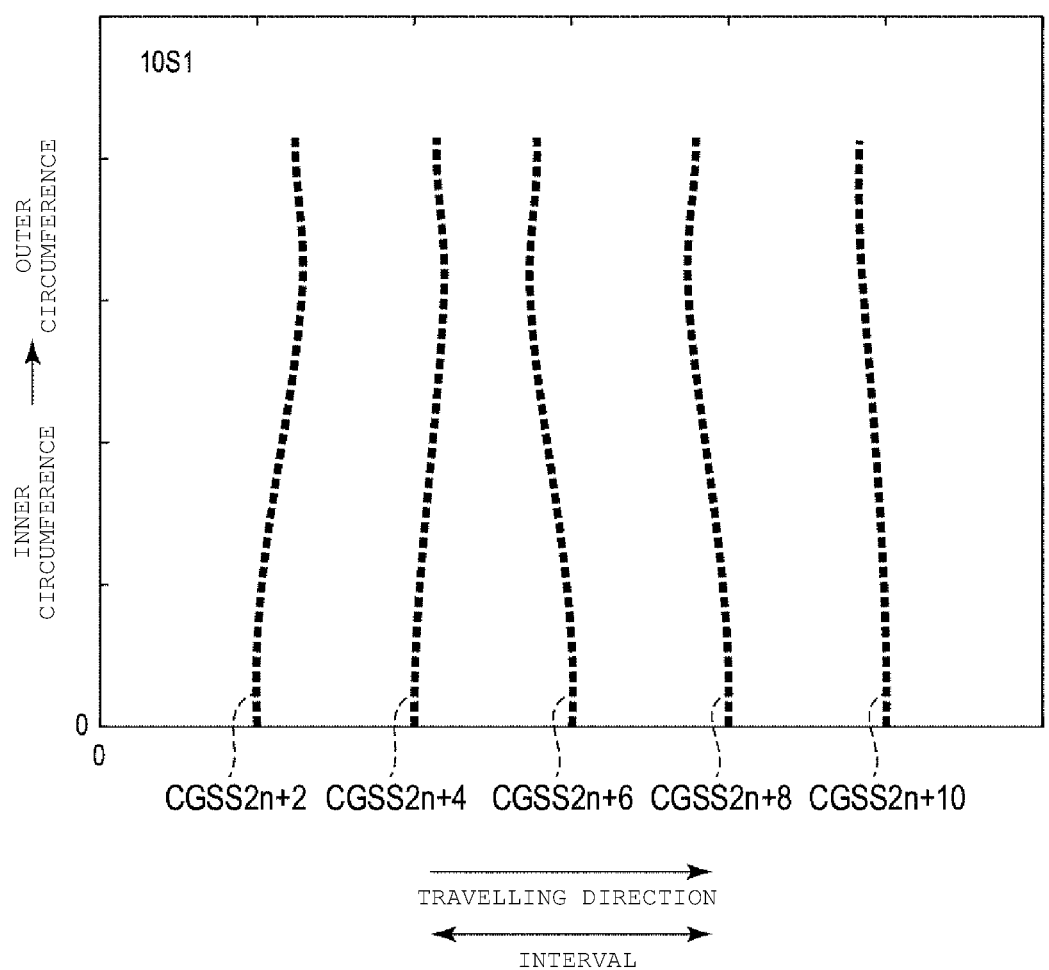
FIG. 11 is a schematic diagram illustrating an example of arrangement of another part of the CGS servo patterns in the first embodiment.

FIG. 11 is a schematic diagram illustrating an example of the arrangement of the CGS servo patterns CGSS on another surface of the disk opposite to the one depicted in FIG. 10 in the present embodiment. In FIG. 11, the vertical axis illustrates the spiral direction from the inner circumference to the outer circumference, and the horizontal axis illustrates the interval when one of the plurality of CGS servo patterns is used as a reference. FIG. 11 corresponds to FIG. 6. FIG. 11 illustrates the CGS servo patterns CGSS2$n$+2 to CGSS2$n$+10 arranged in the traveling direction on the rear surface 10S1 in a plan view.

In the example illustrated in FIG. 11, the CGS servo pattern control unit 620 writes the even-numbered CGS servo patterns CGSS2$n$+2 to CGSS2$n$+10 on the rear surface 10S1 of the disk 10-0 with the head 15-1 from the inner circumference to the outer circumference while switching between the head 15-0 and the head 15-1. The CGS servo pattern control unit 620 writes the even-numbered CGS servo pattern CGSS2$n$+2 on the rear surface 10S1 with the head 15-1 from the inside to the outside based on the back-EMF speed information, starting from the clock reference position. The CGS servo pattern control unit 620 writes the even-numbered CGS servo pattern CGSS2$n$+4 on the rear surface 10S1 with the head 15-1 from the inside to the outside based on the back-EMF speed information. The CGS servo pattern control unit 620 writes the even-numbered CGS servo pattern CGSS2$n$+6 on the rear surface 10S1 with the head 15-1 from the inside to the outside based on the back-EMF speed information. The CGS servo pattern control unit 620 writes the even-numbered CGS servo pattern CGSS2$n$+8 on the rear surface 10S1 with the head 15-1 from the inside to the outside based on the back-EMF speed information. The CGS servo pattern control unit 620 writes the even-numbered CGS servo pattern CGSS2$n$+10 on the rear surface 10S1 with the head 15-1 from the inside to the outside based on the back-EMF speed information.

Figure 12:
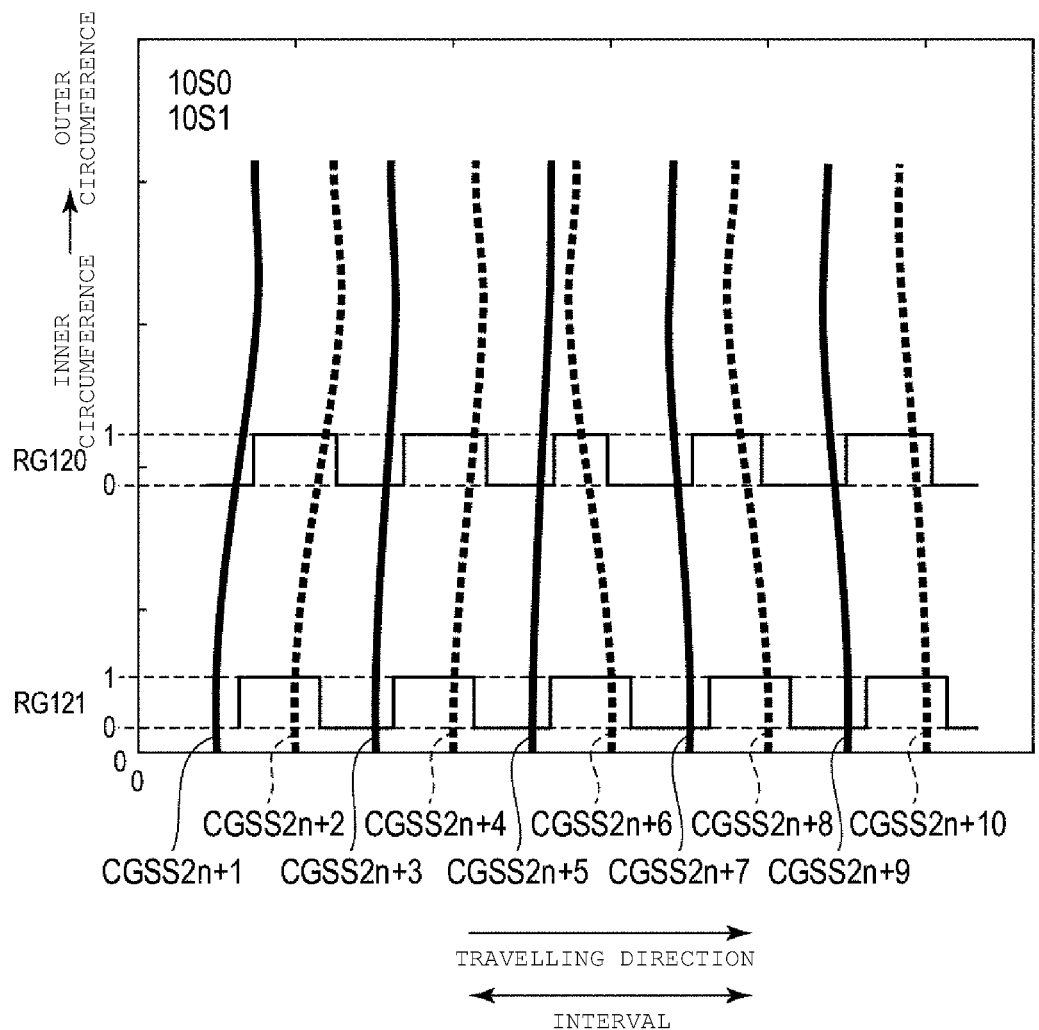
FIG. 12 is a schematic diagram to illustrate an example of a method of writing and a method of reading the CGS servo patterns in the first embodiment.

FIG. 12 is a schematic diagram to illustrate an example of a method of writing and a method of reading the CGS servo pattern in the present embodiment. In FIG. 10, the vertical axis illustrates the spiral direction from the inner circumference to the outer circumference, and the horizontal axis illustrates the interval when one of the plurality of CGS servo patterns is used as a reference. FIG. 12 corresponds to FIG. 9. FIG. 12 illustrates a read gate RG120 and a read gate RG121 at predetermined radial positions of the virtual surface. In FIG. 12, the read gate RG120 asserts the head 15-0 at 0 and the head 15-1 at 1. Further, in FIG. 12, the read gate RG121 asserts the head 15-0 at 0 and the head 15-1 at 1.

In the example illustrated in FIG. 12, the CGS servo pattern control unit 620 alternately reads the odd-numbered CGS servo patterns CGSS2$n$+1 to CGSS2$n$+9 and the even-numbered CGS servo patterns CGSS2$n$+2 to CGSS2$n$+10 from the front surface 10S0 of the disk 10-0 and the back surface 10S1 of the disk 10-0, respectively, while switching between the head 15-0 and the head 15-1 according to the read gate RG120.

In the example illustrated in FIG. 12, the CGS servo pattern control unit 620 alternately reads the odd-numbered CGS servo patterns CGSS$2n+1$ to CGSS$2n+9$ and the even-numbered CGS servo patterns CGSS$2n+2$ to CGSS$2n+10$ from the front surface 10S0 of the disk 10-0 and the back surface 10S1 of the disk 10-0, respectively, while switching between the head 15-0 and the head 15-1 according to the read gate RG121.

The measurement unit 630 measures a plurality of CGS servo patterns. The measurement unit 630 reads and measures the plurality of CGS servo patterns written on the plurality of surfaces of the disk 10 in a distributed manner while switching between the plurality of heads 15 corresponding to the plurality of surfaces of the one or more disks 10.

At a predetermined radial position on the virtual surface of the disk 10, the measurement unit 630 changes (or adjusts) the method of measuring or reading these CGS servo patterns CGSS depending on the interval in the circumferential direction (hereinafter, may be referred to as "virtual CGS interval") between the two virtually adjacent CGS servo patterns CGSS of the plurality of CGS servo patterns CGSS arranged in the circumferential direction.

When it is determined that the virtual CGS interval of two virtually adjacent CGS servo patterns CGSS of the plurality of CGS servo patterns CGSS arranged in the circumferential direction is equal to or greater than a distance (hereafter, "switchable interval") sufficient to switch between the plurality of heads 15 corresponding to the different surfaces of the disk 10 to read the plurality of CGS servo patterns CGSS, at a predetermined radial position on the virtual surface of the disk 10, the measurement unit 630 measures each position (hereinafter, may be referred to as actual CGS position) of the plurality of CGS servo patterns CGSS written on the plurality of surfaces 10S of the disk 10 in the circumferential direction and each virtual CGS interval corresponding to each CGS actual position while switching between the plurality of heads 15. The measurement unit 630 measures or calculates each RRO correction data corresponding to each actual CGS position based on, for example, the measured actual CGS position. Hereinafter, "measuring or calculating RRO correction data based on an RRO correction amount" may be referred to as "RRO learning". In addition, measuring the actual CGS position of the CGS servo pattern CGSS may be referred to as CGS search. The measurement unit 630 may store the measured actual CGS position, virtual CGS interval, and RRO correction data as a table in a predetermined storage area, for example, the system area 10b of the disk 10, the volatile memory 70, the nonvolatile memory 80, or the like.

When it is determined that the virtual CGS interval of two virtually adjacent CGS servo patterns CGSS arranged in the circumferential direction is equal to or greater than the switchable interval at the predetermined radial position on the virtual surface of the disk 10, the measurement unit 630 reads the plurality of CGS servo patterns CGSS arranged in the circumferential direction while switching between the plurality of heads 15 to measure the actual CGS position corresponding to each of the plurality of CGS servo patterns CGSS.

For example, when it is determined that the virtual CGS interval of two virtually adjacent CGS servo patterns CGSS adjacent in the circumferential direction and written on different surfaces is equal to or greater than the switchable interval at the radial position of the virtual surface of the disk 10, for example, in a predetermined track, the measurement unit 630 alternately reads these CGS servo patterns CGSS while switching between the plurality of heads 15 to measure two actual CGS positions corresponding to these CGS servo pattern CGSS.

When it is determined that the virtual CGS interval of two virtually adjacent CGS servo patterns CGSS arranged in the circumferential direction is smaller than the switchable interval at a predetermined radial position on the virtual surface of the disk 10, the measurement unit 630 measures each actual position and each interval (hereinafter, may be referred to as actual CGS interval) in the circumferential direction between two CGS servo patterns CGSS adjacent in the circumferential direction on the same surface, each of which is written on a different one of the plurality of surfaces 10S of the disk 10, a plurality of times at the same radial position, while switching the plurality of heads 15. The measurement unit 630 calculates the virtual CGS interval corresponding to each actual position by combining a plurality of actual CGS intervals corresponding to the plurality of surfaces 10S of the disk 10.

When it is determined that the virtual CGS interval of two virtually adjacent CGS servo patterns CGSS arranged in the circumferential direction is smaller than the switchable interval at a predetermined radial position on the virtual surface of the disk 10, the measurement unit 630 reads the plurality of CGS servo patterns CGSS arranged in the circumferential direction a plurality of times at the same radial position while switching between the plurality of heads 15 to measure the actual CGS positions corresponding to the plurality of CGS servo patterns CGSS.

For example, when it is determined that the virtual CGS interval of two CGS servo patterns CGSS that are adjacent in the circumferential direction and are written on different surfaces is smaller than the switchable interval at the radial position of the virtual surface of the disk 10, for example, in a predetermined track, the measurement unit 630 reads one of these CGS servo patterns CGSS in a first lap with a predetermined head 15 and reads the other unread CGS servo pattern CGSS of these CGS servo patterns CGSS with another head 15 different from the predetermined head 15 to measure two actual CGS positions corresponding to each of these CGS servo patterns CGSS.

The measurement unit 630 changes the switchable interval according to the virtual CGS interval, which varies depending on the seek direction of the head 15 and the speed of the head 15. The measurement unit 630 sets an area (hereinafter, may be referred to as "switchable area") that can be read, for which the plurality of heads 15 can be switched, and an area (hereinafter, may be referred to as "non-switchable area") that cannot be read, for which the plurality of heads 15 can be switched, depending on each actual position and switchable interval of each CGS data pattern at each radial position of the virtual surface of the disk 10. The measurement unit 630 may include the switchable area and the non-switchable area in a table stored in a predetermined area, for example, the system area 10b of the disk 10, the volatile memory 70, the nonvolatile memory 80, or the like.

When reading the CGS servo pattern CGSS in the non-switchable area of the virtual surface of the disk 10, the measurement unit 630 calculates (or estimates) the actual CGS position (hereinafter, may be referred to as estimated CGS position) corresponding to a predetermined CGS servo pattern CGSS corresponding to the next radial position (hereinafter, may be referred to as "next radial position") adjacent to the current radial position in the radial direction based on the virtual CGS interval (hereinafter, may be referred to as "current virtual CGS interval") corresponding to the predetermined CGS servo pattern CGSS at the current radial position and the virtual CGS (hereinafter, may be referred to as "previous radial position") corresponding to this predetermined CGS servo pattern CGSS at the previous radial position adjacent to the current radial position in the radial direction.

For example, when reading the CGS servo pattern CGSS in the non-switchable area of the virtual surface of the disk 10, the measurement unit 630 calculates (or estimates) the estimated CGS position corresponding to the predetermined CGS servo pattern CGSS corresponding to the next track (hereafter, may be referred to as "next track") adjacent to the current track in the radial direction based on the current virtual CGS interval corresponding to the predetermined CGS servo pattern CGSS on the current track and the previous virtual CGS interval corresponding to this predetermined CGS servo pattern CGSS on the previous track (hereafter, may be referred to as "previous track") adjacent to the current track in the radial direction.

When reading the CGS servo pattern CGSS arranged in a non-switchable area, the measurement unit 630 calculates a virtual CGS interval (hereinafter, may be referred to as "estimated virtual CGS interval") corresponding to the estimated CGS position based on the estimated CGS position. In the non-switchable area, the measurement unit 630 seeks the head 15 according to the estimated virtual CGS interval to read a predetermined CGS servo pattern CGSS, and measures the actual CGS position corresponding to this CGS servo pattern CGSS. The measurement unit 630 updates the estimated CGS position corresponding to the CGS servo pattern CGSS in the non-switchable area to the measured actual CGS position to minimize an estimation error.

Figure 13:
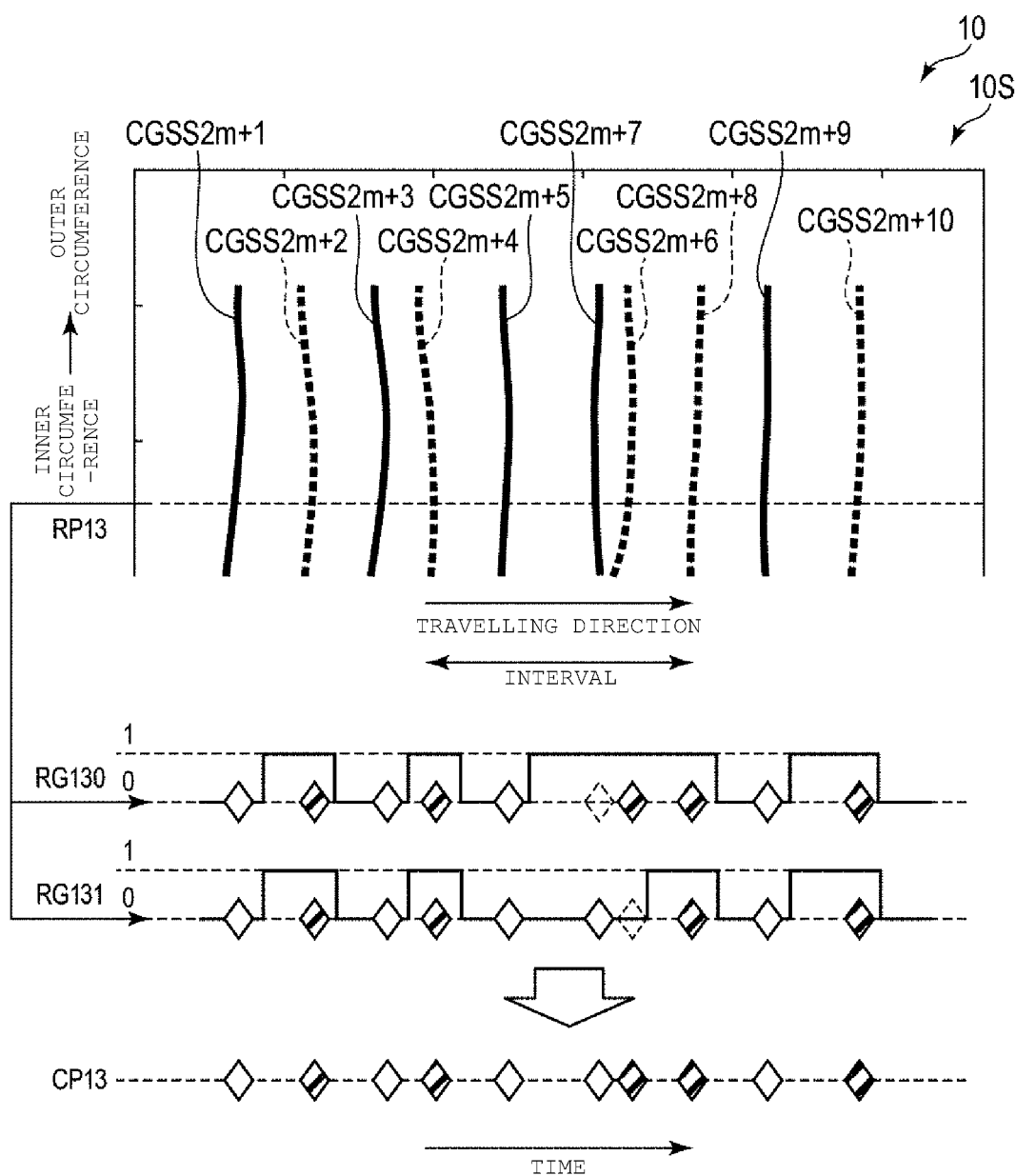
FIG. 13 is a schematic diagram to illustrate an example of a method of reading a plurality of CGS servo patterns written on different surfaces of a disk when a virtual CGS interval in the first embodiment is smaller than a switchable interval.

FIG. 13 is a schematic diagram to illustrate an example of a method of reading a plurality of CGS servo patterns CGSS written on different surfaces 10S when the virtual CGS interval is smaller than the switchable interval. In the top part of FIG. 13, the vertical axis illustrates the spiral direction from the inner circumference to the outer circumference, and the horizontal axis illustrates the interval when one of the plurality of CGS servo patterns is used as a reference. The vertical axis in the top part of FIG. 13 illustrates a radial position RP13. The top part of FIG. 13 illustrates the CGS servo patterns CGSS2$m$+1, CGSS2$m$+2, CGSS2$m$+3, CGSS2$m$+4, CGSS2$m$+5, CGSS2$m$+6, CGSS2$m$+7, CGSS2$m$+8, CGSS2$m$+9, and CGSS2$m$+10 that are continuously arranged in the traveling direction on the virtual surface 10S of the disk 10. m is an integer greater than or equal to 0. The CGS servo patterns CGSS2$m$+1, CGSS2$m$+3, CGSS2$m$+5, CGSS2$m$+7, and CGSS2$m$+9 are odd-numbered CGS servo patterns. The CGS servo patterns CGSS2$m$+2, CGSS2$m$+4, CGSS2$m$+6, CGSS2$m$+8, and CGSS2$m$+10 are even-numbered CGS servo patterns. The odd-numbered CGS servo patterns CGSS2$m$+1, CGSS2$m$+3, CGSS2$m$+5, CGSS2$m$+7, and CGSS2$m$+9, and the even-numbered CGS servo patterns CGSS2$m$+2, CGSS2$m$+4, CGSS2$m$+6, CGSS2$m$+8, and CGSS2$m$+10 are written on different surfaces 10S of the disk 10, respectively. At the radial position RP13 of the virtual surface of the disk 10 in the top part of FIG. 13, the odd-numbered CGS servo pattern CGSS2$m$+7 and the even-numbered CGS servo pattern CGSS2$m$+6 intersect, and the order thereof is changed. The diagram on the bottom of FIG. 13 illustrates read gates RG130 and RG131 at predetermined radial positions on the virtual surface 10S of the disk 10. The bottom part of FIG. 13 illustrates each actual CGS position (hereinafter, may be referred to as "odd-numbered actual CGS position") of each of the odd-numbered CGS servo patterns CGSS2$m$+1 to CGSS2$m$+9 at predetermined radial positions of the virtual surface 10S of the disk 10 and each actual CGS position (hereinafter, may be referred to as "even-numbered actual CGS position") of each of the even-numbered CGS servo patterns CGSS2$m$+2 to CGSS2$m$+10 at predetermined radial positions of the virtual surface 10S of the disk 10. FIG. 13 illustrates the odd-numbered actual CGS positions at the predetermined radial positions of the virtual surface 10S of the disk 10, with white diamonds. FIG. 13 illustrates the even-numbered actual CGS positions at the predetermined radial positions of the virtual surface 10S of the disk 10, with diagonally-hatched diamonds. FIG. 13 illustrates a plurality of actual CGS positions CP13 corresponding to the plurality of CGS servo patterns CGSS at the radial position RP on the virtual surface 10S of the disk 10 in which the plurality of actual CGS positions corresponding to the plurality of CGS servo patterns CGSS read according to the read gate RG130 and the plurality of actual CGS positions corresponding to the plurality CGS servo patterns CGSS read according to the read gate RG131 are combined.

In the example illustrated in FIG. 13, when it is determined that the virtual CGS interval between the odd-numbered CGS servo pattern CGSS2$m$+7 and the even-numbered CGS servo pattern CGSS2$m$+6 is smaller than the switchable interval at the radial position RP13 of the virtual surface 10S of the disk 10, the measurement unit 630 reads the CGS servo patterns CGSS2$m$+1, CGSS2$m$+2, CGSS2$m$+3, CGSS2$m$+4, CGSS2$m$+5, CGSS2$m$+6, CGSS2$m$+8, CGSS2$m$+9, and CGSS2$m$+10 in the order described in the first lap while alternately switching between the plurality of heads 15 to measure the plurality of actual CGS positions corresponding to the CGS servo patterns CGSS2$m$+1, CGSS2$m$+2, CGSS2$m$+3, CGSS2$m$+4, CGSS2$m$+5, CGSS2$m$+6, CGSS2$m$+8, CGSS2$m$+9, and CGSS2$m$+10. In the first lap, the measurement unit 630 does not read the odd-numbered CGS servo pattern CGSS2$m$+7, but reads the even-numbered CGS servo pattern CGSS2$m$+6.

In the example illustrated in FIG. 13, when it is determined that the virtual CGS interval between the odd-numbered CGS servo pattern CGSS2$m$+7 and the even-numbered CGS servo pattern CGSS2$m$+6 is smaller than the switchable interval at the radial position RP13 of the virtual surface 10S of the disk 10, the measurement unit 630 reads the CGS servo patterns CGSS2$m$+1, CGSS2$m$+2, CGSS2$m$+3, CGSS2$m$+4, CGSS2$m$+5, CGSS2$m$+7, CGSS2$m$+8, CGSS2$m$+9, and CGSS2$m$+10 in the order described in a second lap while alternately switching between the plurality of heads 15 to measure the plurality of actual CGS positions corresponding to the CGS servo patterns CGSS2$m$+1, CGSS2$m$+2, CGSS2$m$+3, CGSS2$m$+4, CGSS2$m$+5, CGSS2$m$+7, CGSS2$m$+8, CGSS2$m$+9, and CGSS2$m$+10. In the second lap, the measurement unit 630 does not read the odd-numbered CGS servo pattern CGSS2$m$+6, but reads the even-numbered CGS servo pattern CGSS2$m$+7.

The measurement unit 630 combines a plurality of actual CGS positions corresponding to the CGS servo patterns CGSS2$m$+1, CGSS2$m$+2, CGSS2$m$+3, CGSS2$m$+4, CGSS2$m$+5, CGSS2$m$+6, CGSS2$m$+8, CGSS2$m$+9, and CGSS2$m$+10 and a plurality of actual CGS positions corresponding to the CGS servo patterns CGSS2$m$+1, CGSS2$m$+2, CGSS2$m$+3, CGSS2$m$+4, CGSS2$m$+5, CGSS2$m$+7, CGSS2$m$+8, CGSS2$m$+9, and CGSS2$m$+10 to acquire the plurality of actual CGS positions CP13.

Figure 14:
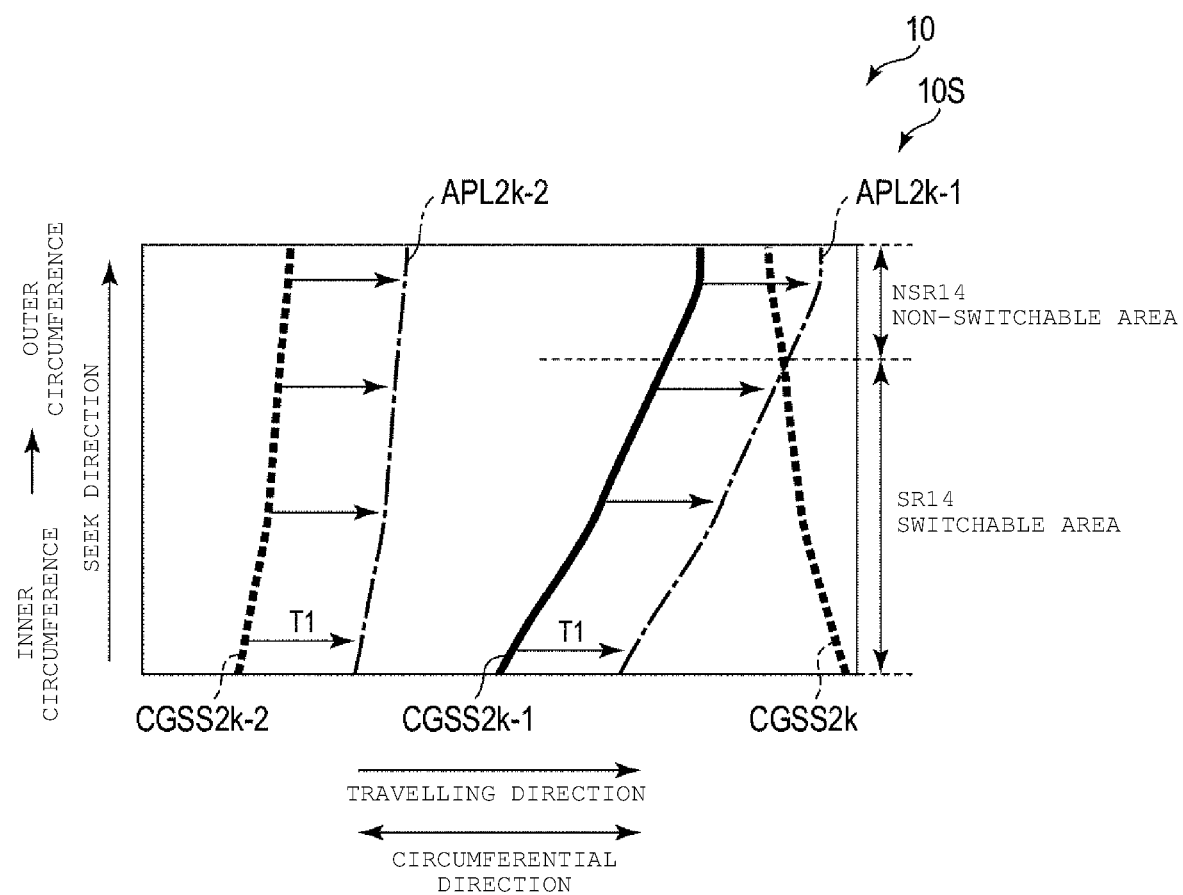
FIG. 14 is a schematic diagram to illustrate an example of a method of setting a non-switchable area in the first embodiment.

FIG. 14 is a schematic diagram to illustrate an example of a method of setting a non-switchable area in the present embodiment. FIG. 14 illustrates the CGS servo patterns CGSS2$k$−2, CGSS2$k$−1, and CGSS2$k$ that are continuously arranged in the traveling direction on the virtual surface of the disk 10. k is an integer greater than or equal to 0. The CGS servo pattern CGSS2$k$−1 is an odd-numbered CGS servo pattern. The CGS servo patterns CGSS2$k$−2 and CGSS2$k$ are even-numbered CGS servo patterns. The odd-numbered CGS servo pattern CGSS2$k$−1, the even-numbered CGS servo patterns CGSS2$k$−2 and CGSS2$k$ are each written on different surfaces 10S of the disk 10. FIG. 14 illustrates a switchable interval T1. FIG. 14 illustrates a change APL2$k$−2 (hereinafter, may be referred to as "change in the switchable interval corresponding to the CGS servo pattern CGSS2$k$−2") at the position of the switchable interval T1 corresponding to the CGS servo pattern CGSS2$k$−2 in the seek direction and a change APL2$k$−1 (hereinafter, may be referred to as "change in the switchable interval corresponding to the CGS servo pattern CGSS2$k$−1") at the position of the switchable interval T1 corresponding to the CGS servo pattern CGSS2$k$−1 in the seek direction. FIG. 14 illustrates a non-switchable area NSR14 and a switchable area SR14. In FIG. 14, the CGS servo pattern CGSS2$k$−1 and the CGS servo pattern CGSS2$k$ are close to each other in the non-switchable area NSR14.

As illustrated in FIG. 14, the measurement unit 630 sets an area in which the virtual CGS interval between the odd-numbered CGS servo pattern CGSS2$k$−1 and the even-numbered CGS servo pattern CGSS2$k$ is the switchable interval T1 or more to the switchable area SR14 depending on the change APL2$k$−1 in the switchable interval corresponding to the CGS servo pattern CGSS2$k$−1.

As illustrated in FIG. 14, the measurement unit 630 sets an area in which the virtual CGS interval between the odd-numbered CGS servo pattern CGSS2$k$−1 and the even-numbered CGS servo pattern CGSS2$k$ is smaller than the switchable interval T1 to the non-switchable area NSR14 depending on the change APL2$k$−1 in the switchable interval corresponding to the CGS servo pattern CGSS2$k$−1.

Figure 15:
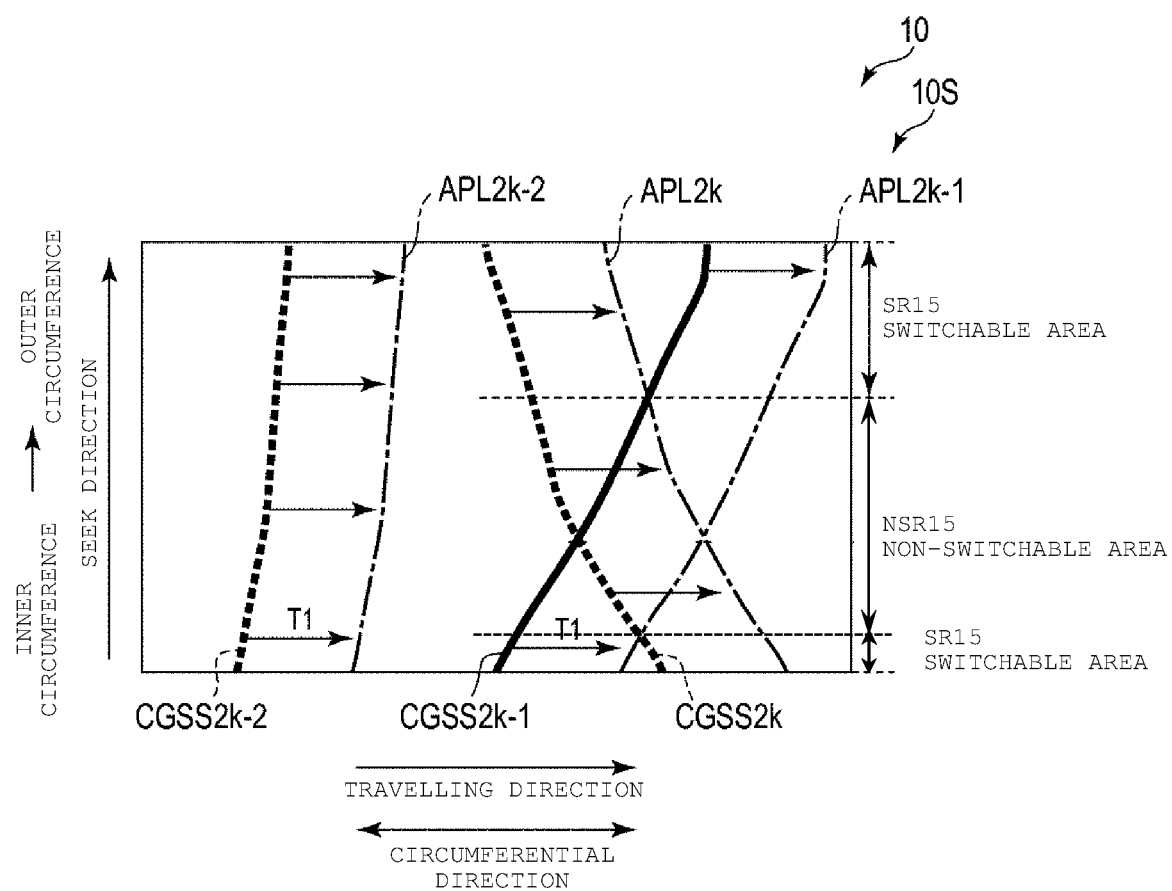
FIG. 15 is a schematic diagram to illustrate another example of the method of setting the non-switchable area in the first embodiment.

FIG. 15 is a schematic diagram to illustrate another example of the method of setting the non-switchable area in the present embodiment. FIG. 15 illustrates a non-switchable area NSR15 and a switchable area SR15. In FIG. 15, the CGS servo pattern CGSS2$k$−1 and the CGS servo pattern CGSS2$k$ intersect in the non-switchable area NSR15 when viewed in a plan view.

As illustrated in FIG. 15, the measurement unit 630 sets an area in which the virtual CGS interval between the odd-numbered CGS servo pattern CGSS2$k$−1 and the even-numbered CGS servo pattern CGSS2$k$ is the switchable interval T1 or more to the switchable area SR15 depending on the change APL2$k$−1 in the switchable interval corresponding to the CGS servo pattern CGSS2$k$−1.

As illustrated in FIG. 15, the measurement unit 630 sets an area in which the virtual CGS interval between the odd-numbered CGS servo pattern CGSS2$k$−1 and the even-numbered CGS servo pattern CGSS2$k$ is smaller than the switchable interval T1 to the non-switchable area NSR15 depending on the change APL2$k$−1 in the switchable interval corresponding to the CGS servo pattern CGSS2$k$−1.

Figure 16:
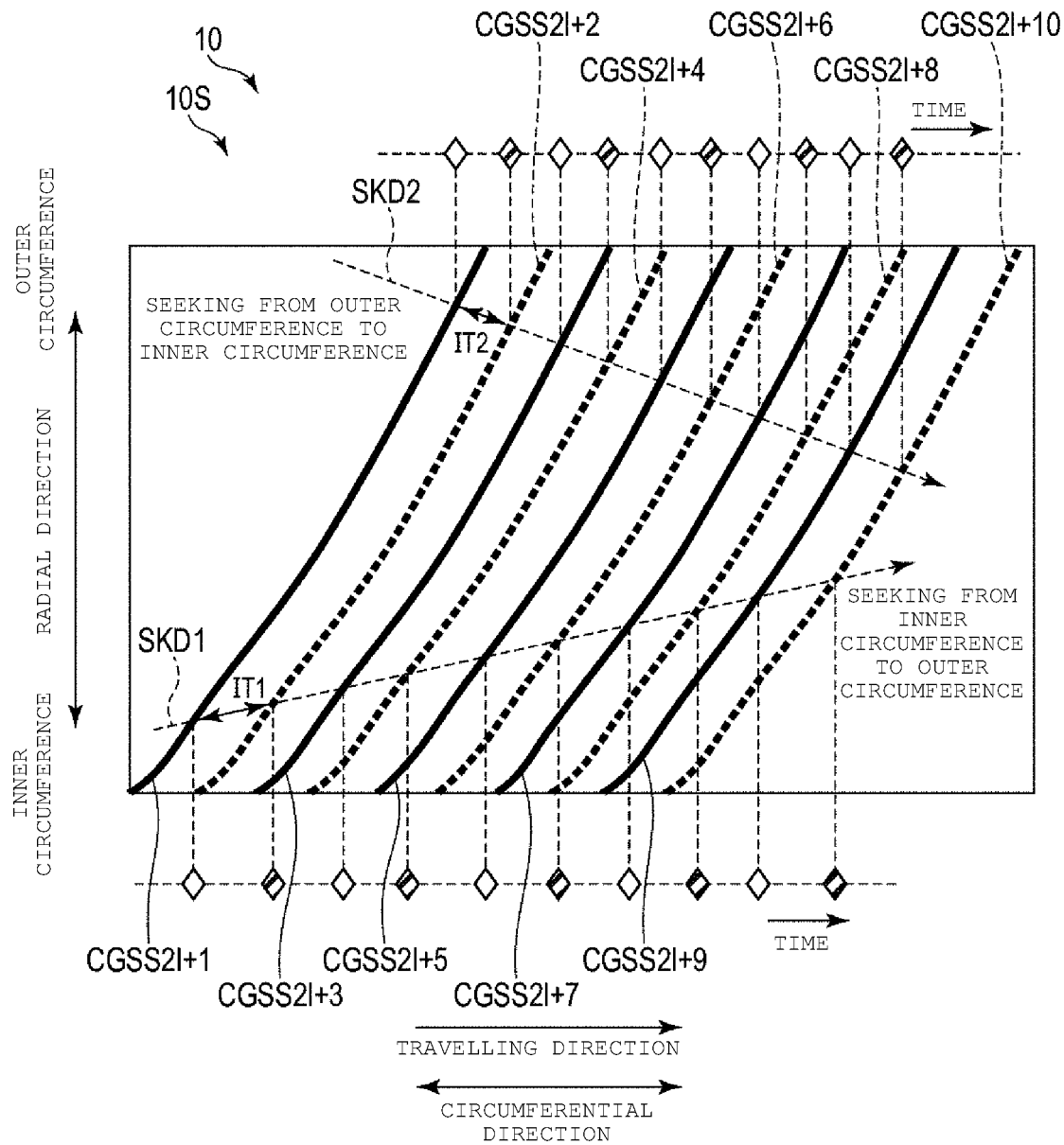
FIG. 16 is a schematic diagram illustrating an example of variations in the switchable interval in the first embodiment.

FIG. 16 is a schematic diagram to illustrate an example of variations in the switchable interval in the present embodiment. In FIG. 16, the vertical axis indicates the radial direction, and the horizontal axis indicates the circumferential direction. FIG. 16 illustrates the CGS servo patterns CGSS2$l$+1, CGSS2$l$+2, CGSS2$l$+3, CGSS2$l$+4, CGSS2$l$+5, CGSS2$l$+6, CGSS2$l$+7, CGSS2$l$+8, CGSS2$ml$+9, and CGSS2$l$+10 that are continuously arranged in the circumferential direction on the virtual surface 10S of the disk 10. l is an integer greater than or equal to 0. The CGS servo patterns CGSS2$l$+1, CGSS2$l$+3, CGSS2$l$+5, CGSS2$l$+7, and CGSS2$l$+9 are odd-numbered CGS servo patterns. The CGS servo patterns CGSS2$l$+2, CGSS2$m$+4, CGSS2$l$+6, CGSS2$l$+8, and CGSS2$l$+10 are even-numbered CGS servo patterns. The odd-numbered CGS servo patterns CGSS2$l$+1, CGSS2$l$+3, CGSS2$l$+5, CGSS2$l$+7, and CGSS2$l$+9 and the even-numbered CGS servo patterns CGSS2$l$+2, CGSS2$l$+4, CGSS2$l$+6, CGSS2$l$+8, and CGSS2$l$+10 are written on different surfaces 10S of the disk 10, respectively. FIG. 16 illustrates a seek direction SKD1 (hereinafter, may be referred to as a seek direction) from the inner circumference to the outer circumference and a seek direction SKD2 seeking from the outer circumference to the inner circumference. The lower part of FIG. 16 illustrates the odd-numbered actual CGS position of each of the odd-numbered CGS servo patterns CGSS2$l$+1 to CGSS2$l$+9 read along the seek direction SKD1 and the even-numbered actual CGS position of each of the even-numbered CGS servo patterns CGSS2$l$+2 to CGSS2$l$+10 read along the seek direction SKD1 on the virtual surface 10S of the disk 10. The upper part of FIG. 16 illustrates the odd-numbered actual CGS position of each of the odd-numbered CGS servo patterns CGSS2$l$+1 to CGSS2$l$+9 read along the seek direction SKD2 and the even-numbered actual CGS position of each of the even-numbered CGS servo patterns CGSS2$l$+2 to CGSS2$l$+10 read along the seek direction SKD2 on the virtual surface 10S of the disk 10. FIG. 16 illustrates the odd-numbered actual CGS positions at the predetermined radial positions of the virtual surface 10S of the disk 10, with white diamonds. FIG. 16 illustrates the even-numbered actual CGS positions at the predetermined radial positions of the virtual surface 10S of the disk 10, with diagonally-hatched diamonds. FIG. 16 illustrates a virtual CGS interval IT1 between the CGS servo pattern CGSS2$l$+1 and the CGS servo pattern CGSS2$l$+2 along the seek direction SKD1, and a virtual CGS interval IT2 between the CGS servo pattern CGSS2$l$+1 and the CGS servo pattern CGSS2$l$+2 along the seek direction SKD2.

In the example illustrated in FIG. 16, the virtual CGS interval IT1 along the seek direction SKD1 and the virtual CGS interval IT2 along the seek direction SKD2 are different. Therefore, the measurement unit 630 changes the switchable interval between the seek direction SKD1 and the seek direction SKD2.

Figure 17:
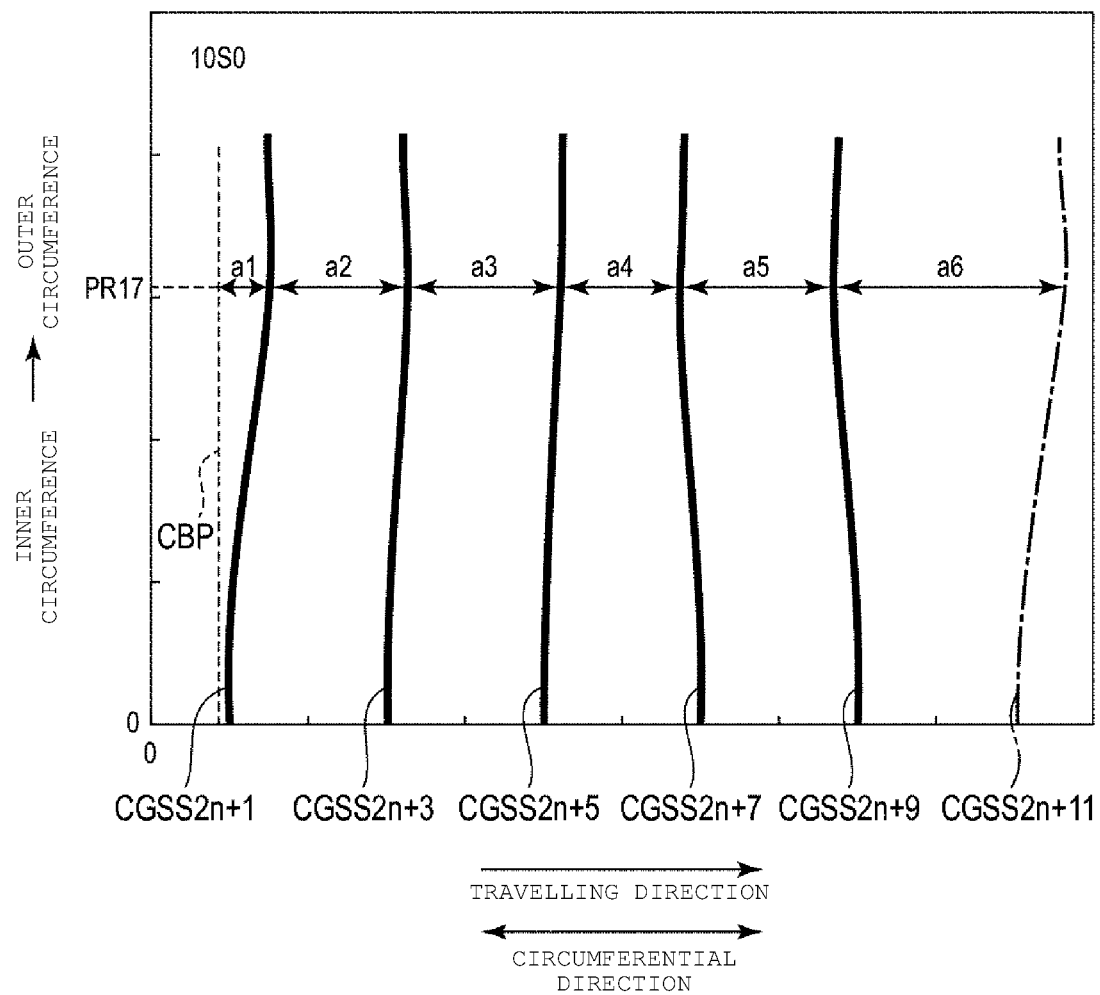
FIG. 17 is a schematic diagram to illustrate an example of measurement of actual CGS intervals corresponding to odd-numbered CGS servo patterns written on a surface of a disk in the first embodiment.

FIG. 17 is a schematic diagram to illustrate an example of measurement of the actual CGS intervals corresponding to the odd-numbered CGS servo patterns CGSS written on the front surface 10S0 in the present embodiment. FIG. 17 corresponds to FIG. 10. FIG. 17 illustrates a clock-based position CBP and the odd-numbered CGS servo pattern CGSS2$n$+11 adjacent in the traveling direction to the odd-numbered CGS servo patterns CGSS2$n$+9 on the front surface 10S0. FIG. 17 illustrates a radial position RP17 on the front surface 10S0. FIG. 17 illustrates an actual CGS interval a1 between the clock-based position CBP and the odd-numbered CGS servo pattern CGSS2$n$+1 at the radial position RP17 on the front surface 10S0, an actual CGS interval a2 between the odd-numbered CGS servo pattern CGSS2$n$+1 and the odd-numbered CGS servo pattern CGSS2$n$+3 at the radial position RP17 on the front surface 10S0, an actual CGS interval a3 between the odd-numbered CGS servo pattern CGSS2$n$+3 and the odd-numbered CGS servo pattern CGSS2$n$+5 at the radial position RP17 on the front surface 10S0, an actual CGS interval a4 between the odd-numbered CGS servo pattern CGSS2n+5 and the odd-numbered CGS servo pattern CGSS2n+7 at the radial position RP17 on the front surface 10S0, an actual CGS interval a5 between the odd-numbered CGS servo pattern CGSS2n+7 and the odd-numbered CGS servo pattern CGSS2n+9 at the radial position RP17 on the front surface 10S0, and an actual CGS interval a6 between the odd-numbered CGS servo pattern CGSS2n+9 and the odd-numbered CGS servo pattern CGSS2n+11 at the radial position RP17 on the front surface 10S0.

In the example illustrated in FIG. 17, the measurement unit 630 measures the plurality of odd-numbered actual CGS positions corresponding to the plurality of odd-numbered CGS servo patterns CGSS2n+1 to CGSS2n+11 at the radial position RP17 on the surface 10S0.

The measurement unit 630 calculates the actual CGS interval a1 between the clock-based position at the radial position RP17 and the odd-numbered CGS servo pattern CGSS2n+1 based on the clock-based position CBP at the radial position RP17 on the front surface 10S0 and the odd-numbered actual CGS position corresponding to the odd-numbered CGS servo pattern CGSS2n+1.

The measurement unit 630 calculates the actual CGS interval a2 between the odd-numbered CGS servo pattern CGSS2n+1 and the odd-numbered CGS servo pattern CGSS2n+3 at the radial position RP17 based on the odd-numbered actual CGS position corresponding to the odd-numbered CGS servo pattern CGSS2n+1 and the odd-numbered actual CGS position corresponding to the odd-numbered CGS servo pattern CGSS2n+3 at the radial position RP17 on the front surface 10S0.

The measurement unit 630 calculates the actual CGS interval a3 between the odd-numbered CGS servo pattern CGSS2n+3 and the odd-numbered CGS servo pattern CGSS2n+5 at the radial position RP17 based on the odd-numbered actual CGS position corresponding to the odd-numbered CGS servo pattern CGSS2n+3 and the odd-numbered actual CGS position corresponding to the odd-numbered CGS servo pattern CGSS2n+5 at the radial position RP17 on the front surface 10S0.

The measurement unit 630 calculates the actual CGS interval a4 between the odd-numbered CGS servo pattern CGSS2n+5 and the odd-numbered CGS servo pattern CGSS2n+7 at the radial position RP17 based on the odd-numbered actual CGS position corresponding to the odd-numbered CGS servo pattern CGSS2n+5 and the odd-numbered actual CGS position corresponding to the odd-numbered CGS servo pattern CGSS2n+7 at the radial position RP17 on the front surface 10S0.

The measurement unit 630 calculates the actual CGS interval a5 between the odd-numbered CGS servo pattern CGSS2n+7 and the odd-numbered CGS servo pattern CGSS2n+9 at the radial position RP17 based on the odd-numbered actual CGS position corresponding to the odd-numbered CGS servo pattern CGSS2n+7 and the odd-numbered actual CGS position corresponding to the odd-numbered CGS servo pattern CGSS2n+9 at the radial position RP17 on the front surface 10S0.

The measurement unit 630 calculates the actual CGS interval a6 between the odd-numbered CGS servo pattern CGSS2n+9 and the odd-numbered CGS servo pattern CGSS2n+11 at the radial position RP17 based on the odd-numbered actual CGS position corresponding to the odd-numbered CGS servo pattern CGSS2n+9 and the odd-numbered actual CGS position corresponding to the odd-numbered CGS servo pattern CGSS2n+11 at the radial position RP17 on the front surface 10S0.

Figure 18:
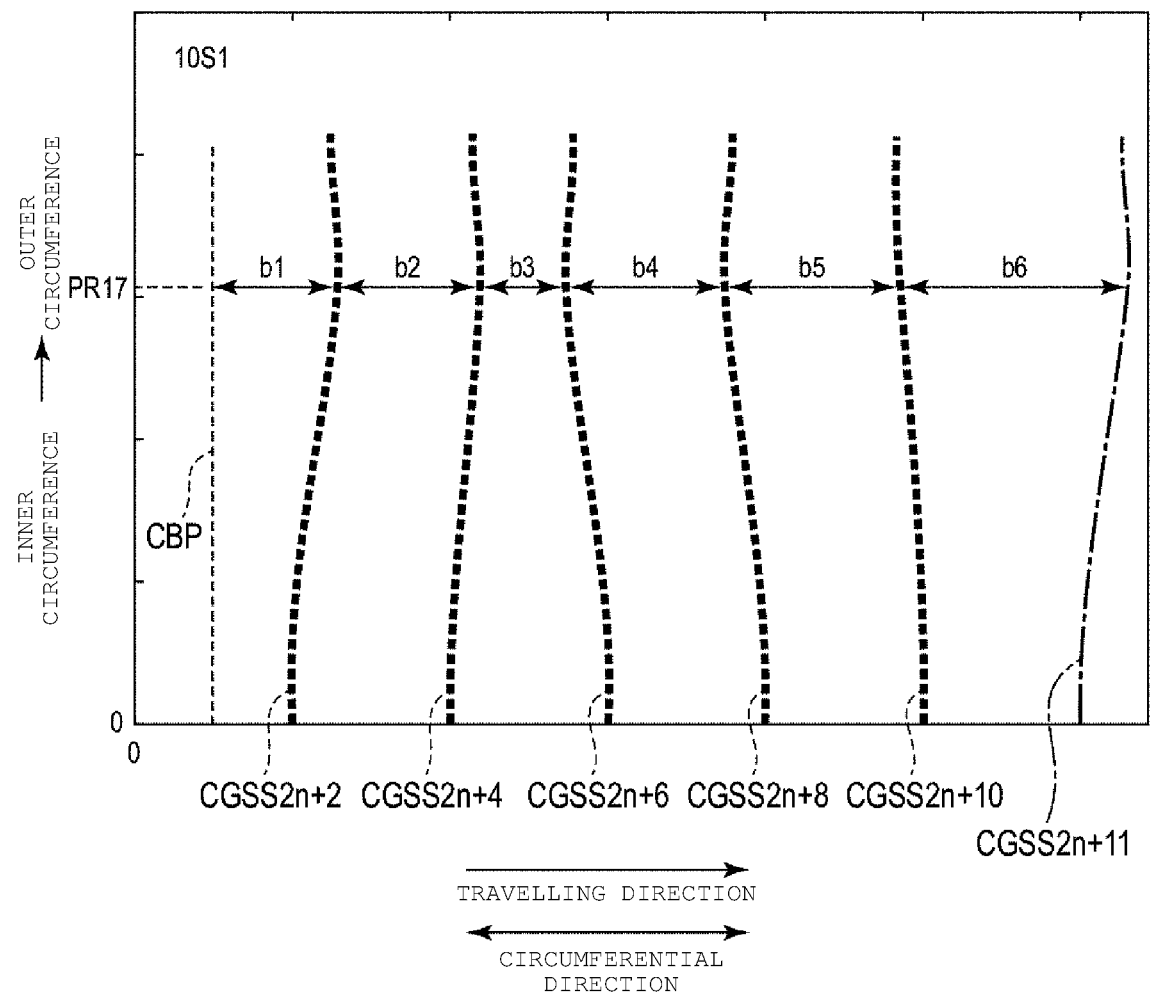
FIG. 18 is a schematic diagram to illustrate an example of measurement of actual CGS intervals corresponding to even-numbered CGS servo patterns written on a back surface of the disk in the first embodiment.

FIG. 18 is a schematic diagram to illustrate an example of measurement of actual CGS intervals corresponding to the even-numbered CGS servo patterns written on the back surface 10S1 in the present embodiment. FIG. 18 corresponds to FIG. 11. FIG. 18 illustrates the clock-based position CBP and the odd-numbered CGS servo pattern CGSS2n+11. FIG. 18 illustrates the radial position RP17 on the back surface 10S1. FIG. 18 illustrates an actual CGS interval b1 between the clock-based position CBP and the even-numbered CGS servo pattern CGSS2n+2 at the radial position RP17 on the back surface 10S1, an actual CGS interval b2 between the even-numbered CGS servo pattern CGSS2n+2 and the even-numbered CGS servo pattern CGSS2n+4 at the radial position RP17 on the back surface 10S1, an actual CGS interval b3 between the even-numbered CGS servo pattern CGSS2n+4 and the even-numbered CGS servo pattern CGSS2n+6 at the radial position RP17 on the back surface 10S1, an actual CGS interval b4 between the even-numbered CGS servo pattern CGSS2n+6 and the even-numbered CGS servo pattern CGSS2n+8 at the radial position RP17 on the back surface 10S1, an actual CGS interval b5 between the even-numbered CGS servo pattern CGSS2n+8 and the even-numbered CGS servo pattern CGSS2n+10 at the radial position RP17 on the back surface 10S1, and an actual CGS interval b6 between the even-numbered CGS servo pattern CGSS2n+10 and the odd-numbered CGS servo pattern CGSS2n+11 at the radial position RP17 of the back surface 10S1.

In the example illustrated in FIG. 18, the measurement unit 630 measures the plurality of actual CGS positions corresponding to each of the plurality of even-numbered CGS servo patterns CGSS2n+2 to CGSS2n+11 at the radial position RP17 of the back surface 10S1.

The measurement unit 630 calculates the actual CGS interval b1 between the clock-based position CBP and the even-numbered CGS servo pattern CGSS2n+2 based on the clock-based position CBP at the radial position RP17 on the back side 10S1 and the even-numbered actual CGS position corresponding to the even-numbered CGS servo pattern CGSS2n+2.

The measurement unit 630 calculates the actual CGS interval b2 between the even-numbered CGS servo pattern CGSS2n+2 and the even-numbered CGS servo pattern CGSS2n+4 at the radial position RP17 based on the even-numbered actual CGS position corresponding to the even-CGS servo pattern CGSS2n+2 and the odd-numbered actual CGS position corresponding to the even-numbered CGS servo pattern CGSS2n+4 at the radial position RP17 of the back surface 10S1.

The measurement unit 630 calculates the actual CGS interval b3 between the even-numbered CGS servo pattern CGSS2n+4 and the even-numbered CGS servo pattern CGSS2n+6 at the radial position RP17 based on the even-numbered actual CGS position corresponding to the even-numbered CGS servo pattern CGSS2n+4 and the even-numbered actual CGS position corresponding to the even-numbered CGS servo pattern CGSS2n+6 at the radial position RP17 of the back surface 10S1.

The measurement unit 630 calculates the actual CGS interval b4 between the even-numbered CGS servo pattern CGSS2n+6 and the even-numbered CGS servo pattern CGSS2n+8 at the radial position RP17 based on the even-numbered actual CGS position corresponding to the even-numbered CGS servo pattern CGSS2n+6 and the even-numbered actual CGS position corresponding to the even-numbered CGS servo pattern CGSS2n+8 at the radial position RP17 of the back surface 10S1.

The measurement unit 630 calculates the actual CGS interval b5 between the even-numbered CGS servo pattern CGSS2n+8 and the even-numbered CGS servo pattern CGSS2n+10 at the radial position RP17 based on the even-numbered actual CGS position corresponding to the even-numbered CGS servo pattern CGSS2n+8 and the even-numbered actual CGS position corresponding to the even-numbered CGS servo pattern CGSS2n+10 at the radial position RP17 of the back surface 10S1.

The measurement unit 630 calculates the actual CGS interval b6 between the even-numbered CGS servo pattern CGSS2n+10 and the odd-numbered CGS servo pattern CGSS2n+11 at the radial position RP17 based on the even-numbered actual CGS position corresponding to the even-numbered CGS servo pattern CGSS2n+10 and the odd-numbered actual CGS position corresponding to the odd-numbered CGS servo pattern CGSS2n+11 at the radial position RP17 of the back surface 10S1.

Figure 19:
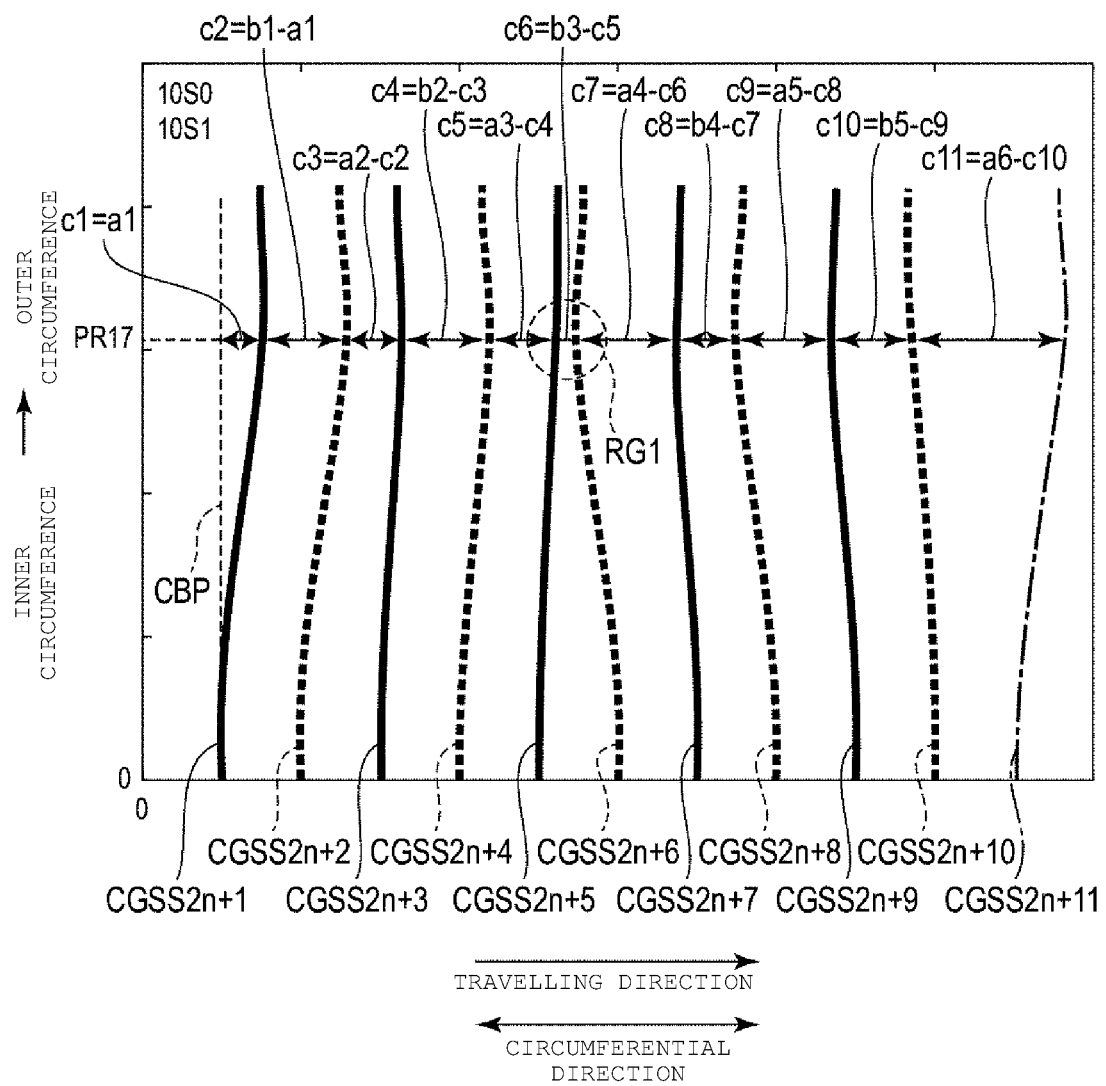
FIG. 19 is a schematic diagram illustrating a combined example of the actual CGS intervals of FIG. 17 and the actual CGS intervals of FIG. 18.

FIG. 19 is a schematic diagram illustrating a combined example of the actual CGS intervals of FIG. 17 and the actual CGS intervals of FIG. 18. FIG. 19 corresponds to FIGS. 17 and 18. FIG. 19 illustrates virtual surface. FIG. 19 illustrates the radial position RP17 on the virtual surface.

In the example illustrated in FIG. 19, the measurement unit 630 combines the plurality of actual CGS intervals corresponding to each of the plurality of odd-numbered CGS servo patterns CGSS2n+1 to CGSS2n+11 at the radial position RP17 of the virtual surface 10S and the plurality of actual CGS intervals corresponding to each of the plurality of even-numbered CGS servo patterns CGSS2n+2 to CGSS2n+10 at the radial position RP17 to calculate the virtual CGS intervals corresponding to each of the plurality of CGS servo patterns CGSS2n+1, CGSS2n+2, CGSS2n+1, CGSS2n+3, CGSS2n+4, CGSS2n+5, CGSS2n+6, CGSS2n+7, CGSS2n+8, CGSS2n+9, and CGSS2n+10 at the radial position RP17.

The measurement unit 630 calculates a virtual CGS interval c2=b1−a1 between the odd-numbered CGS servo pattern CGSS2n+1 and the even-numbered CGS servo pattern CGSS2n+2 at the radial position RP17 from the actual CGS interval a1 between the clock-based position CBP and the odd-numbered CGS servo pattern CGSS2n+1 at the radial position RP17, and the actual CGS interval b1 between the clock-based position CBP and the even-numbered CGS servo pattern CGSS2n+2 at the radial position RP17.

The measurement unit 630 calculates a virtual CGS interval c3=a2−c2 between the even-numbered CGS servo pattern CGSS2n+2 and the odd-numbered CGS servo pattern CGSS2n+3 at the radial position RP17 from the actual CGS interval a2 between the odd-numbered CGS servo pattern CGSS2n+1 and the odd-numbered CGS servo pattern CGSS2n+3 at the radial position RP17 and the virtual CGS interval c2 between the odd-numbered CGS servo pattern CGSS2n+1 and the even-numbered CGS servo pattern CGSS2n+2 at the radial position RP17.

The measurement unit 630 calculates a virtual CGS interval c4=b2−c3 between the odd-numbered CGS servo pattern CGSS2n+3 and the even-numbered CGS servo pattern CGSS2n+4 at the radial position RP17 from the actual CGS interval b2 between the even-numbered CGS servo pattern CGSS2n+2 and the even-numbered CGS servo pattern CGSS2n+4 at the radial position RP17 and the virtual CGS interval c3 between the even-numbered CGS servo pattern CGSS2n+2 and the odd-numbered CGS servo pattern CGSS2n+3 at the radial position RP17.

The measurement unit 630 calculates a virtual CGS interval c5=a3−c4 between the even-numbered CGS servo pattern CGSS2n+4 and the odd-numbered CGS servo pattern CGSS2n+5 at the radial position RP17 from the actual CGS interval a3 between the odd-numbered CGS servo pattern CGSS2n+3 and the odd-numbered CGS servo pattern CGSS2n+5 at the radial position RP17 and the virtual CGS interval c4 between the odd-numbered CGS servo pattern CGSS2n+3 and the even-numbered CGS servo pattern CGSS2n+4 at radial position RP17.

The measurement unit 630 calculates a virtual CGS interval c6=b3−c5 between the odd-numbered CGS servo pattern CGSS2n+5 and the even-numbered CGS servo pattern CGSS2n+6 at the radial position RP17 from the actual CGS interval b3 between the even-numbered CGS servo pattern CGSS2n+4 and the even-numbered CGS servo pattern CGSS2n+6 at the radial position RP17 and the virtual CGS interval c5 between the odd-numbered CGS servo pattern CGSS2n+3 and the even-numbered CGS servo pattern CGSS2n+4 at the radial position RP17.

The measurement unit 630 calculates a virtual CGS interval c7=a4−c6 between the even-numbered CGS servo pattern CGSS2n+6 and the odd-numbered CGS servo pattern CGSS2n+7 at the radial position RP17 from the actual CGS interval a4 between the odd-numbered CGS servo pattern CGSS2n+5 and the odd-numbered CGS servo pattern CGSS2n+7 at the radial position RP17 and the virtual CGS interval c6 between the odd-numbered CGS servo pattern CGSS2n+5 and the even-numbered CGS servo pattern CGSS2n+6 at the radial position RP17.

The measurement unit 630 calculates a virtual CGS interval c8=b4−c7 between the odd-numbered CGS servo pattern CGSS2n+7 and the even-numbered CGS servo pattern CGSS2n+8 at the radial position RP17 from the actual CGS interval b4 between the even-numbered CGS servo pattern CGSS2n+6 and the even-numbered CGS servo pattern CGSS2n+8 at the radial position RP17 and the virtual CGS interval c7 between the even-numbered CGS servo pattern CGSS2n+6 and the odd-numbered CGS servo pattern CGSS2n+7 at the radial position RP17.

The measurement unit 630 calculates a virtual CGS interval c9=a5−c8 between the even-numbered CGS servo pattern CGSS2n+8 and the odd-numbered CGS servo pattern CGSS2n+9 at the radial position RP17 from the actual CGS interval a5 between the odd-numbered CGS servo pattern CGSS2n+7 and the odd-numbered CGS servo pattern CGSS2n+9 at the radial position RP17 and the virtual CGS interval c8 between the odd-numbered CGS servo pattern CGSS2n+7 and the even-numbered CGS servo pattern CGSS2n+8 at the radial position RP17.

The measurement unit 630 calculates a virtual CGS interval c10=b5−c9 between the odd-numbered CGS servo pattern CGSS2n+9 and the even-numbered CGS servo pattern CGSS2n+10 at the radial position RP17 from the actual CGS interval b5 between the even-numbered CGS servo pattern CGSS2n+8 and the even-numbered CGS servo pattern CGSS2n+10 at the radial position RP17 and the virtual CGS interval c9 between the even-numbered CGS servo pattern CGSS2n+8 and the odd-numbered CGS servo pattern CGSS2n+9 at the radial position RP17.

The measurement unit 630 calculates the virtual CGS interval c11=a6−c10 between the even-numbered CGS servo pattern CGSS2n+10 and the odd-numbered CGS servo pattern CGSS2n+11 at the radial position RP17 from the actual CGS interval a6 between the odd-numbered CGS servo pattern CGSS2n+9 and the odd-numbered CGS servo pattern CGSS2n+11 at the radial position RP17 and the virtual CGS interval c10 between the odd-numbered CGS servo pattern CGSS2n+9 and the even-numbered CGS servo pattern CGSS2n+10 at the radial position RP17.

Figure 20:
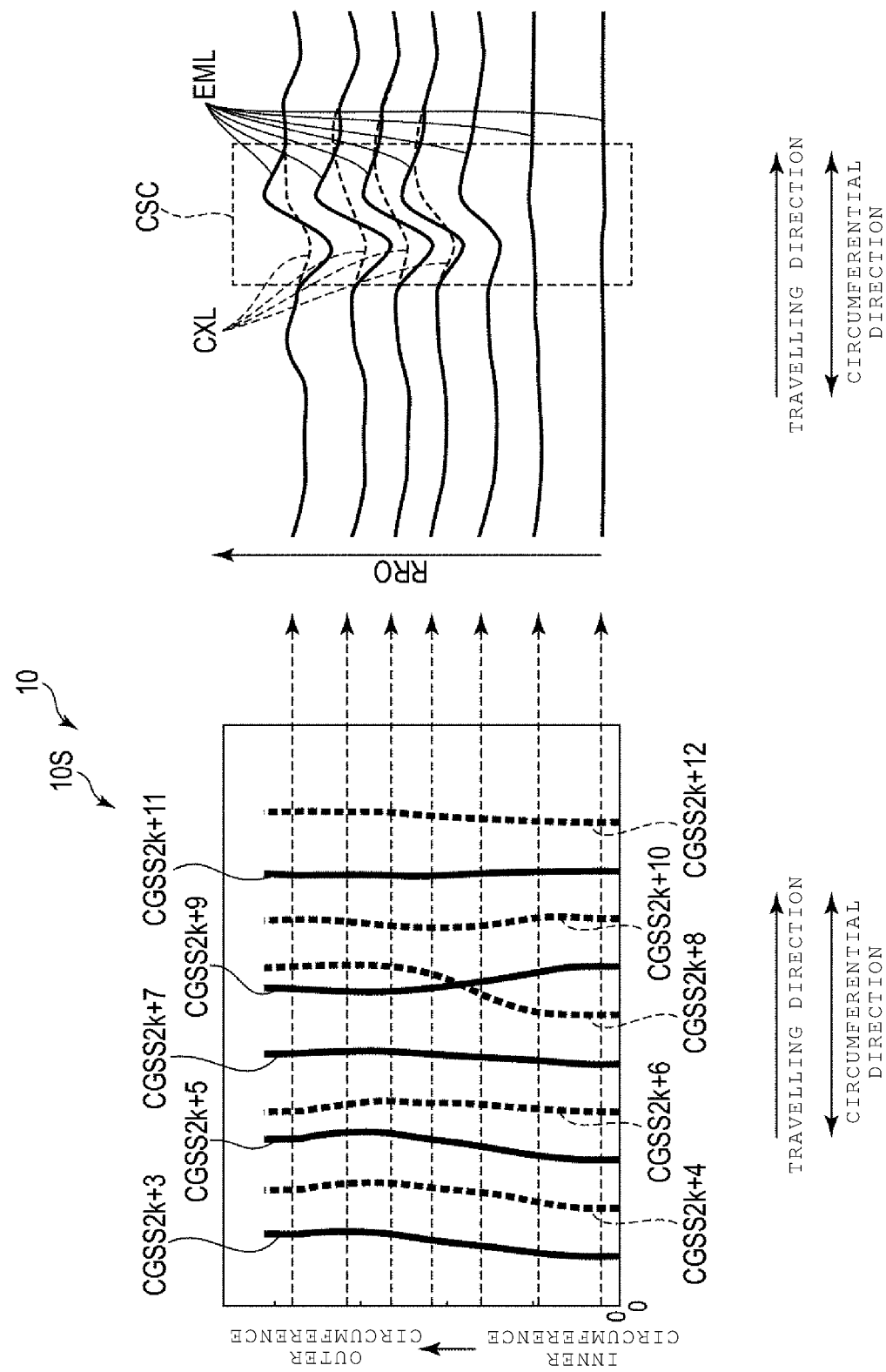
FIG. 20 is a schematic diagram illustrating an example of a measurement result of a change in RRO in the first embodiment.

FIG. 20 is a schematic diagram illustrating an example of a measurement result of the change in RRO in the present embodiment. In the left part of FIG. 20, the vertical axis indicates the spiral direction from the inner circumference to the outer circumference, and the horizontal axis indicates the circumferential direction. The left part of FIG. 20 illustrates the CGS servo patterns CGSS2k+3, CGSS2k+4, CGSS2k+5, CGSS2k+6, CGSS2k+7, CGSS2k+8, CGSS2k+9, CGSS2k+10, CGSS2k+11, and CGSS2k+11 that are continuously arranged in the circumferential direction on the virtual surface 10S of the disk 10. k is an integer greater than or equal to 0. The CGS servo patterns CGSS2k+3, CGSS2k+5, CGSS2k+7, CGSS2k+9, and CGSS2k+11 are odd-numbered CGS servo patterns. The CGS servo patterns CGSS2k+4, CGSS2k+6, CGSS2k+8, CGSS2k+10, and CGSS2k+12 are even-numbered CGS servo patterns. The odd-numbered CGS servo patterns CGSS2k+3, CGSS2k+5, CGSS2k+7, CGSS2k+9, and CGSS2k+11 and the even-numbered CGS servo patterns CGSS2k+4, CGSS2k+6, CGSS2k+8, CGSS2k+10, and CGSS2k+12 are written on different surfaces 10S of the disk 10, respectively. At a predetermined radial position of the virtual surface 10S of the disk 10 in the left part of FIG. 20, the odd-numbered CGS servo pattern CGSS2k+9 and the even-numbered CGS servo pattern CGSS2k+8 intersect, and the order thereof is changed. In the right part of FIG. 20, the vertical axis illustrates the RRO corresponding to each radial position on the left part of FIG. 20, and the horizontal axis illustrates the circumferential direction. The right part of FIG. 20 illustrates an intersection area CSC corresponding to each radial position of the odd-numbered CGS servo pattern CGSS2k+9 and the even-numbered CGS servo pattern CGSS2k+8. The intersection area CSC in the right part of FIG. 20 illustrates a change CXL in RRO (hereinafter, may be simply referred to as change in RRO) at each radial position measured by writing the plurality of CGS servo patterns CGSS2k+3 to CGSS2k+12 on the same surface and a change EML at each radial position measured by writing the plurality of odd-numbered CGS servo patterns CGSS2k+3 to CGSS2k+11 and the plurality of even-numbered CGS servo patterns CGSS2k+4 to CGSS2k+12 according to the present embodiment on different surfaces.

As illustrated by the change CXL in RRO in FIG. 20, since the plurality of CGS servo patterns CGSS2k+3 to CGSS2k+12 have the same data structure and frequency, when these CGS servo patterns CGSSk+3 to CGSS2K12 are written on the same surface and intersect at a part of the CGS servo patterns CGSS2k+8 and CGSS2k+9, it is difficult to determine that the order has been changed. Also, when the plurality of CGS servo patterns CGSSk+3 to CGSS2K12 are written on the same surface and a part of the CGS servo patterns CGSS2k+8 and CGSS2k+9 intersect, since a part of the CGS servo patterns CGSS2k+8 and CGSS2k+9 actually intersects on the same surface, the data at the portion where the CGS servo patterns CGSS2k+8 and CGSS2k+9 intersect may be lost.

On the other hand, as illustrated by the change EML in RRO in FIG. 20, the plurality of odd-numbered CGS servo patterns CGSS2k+3 to 2k+11 and the plurality of even-numbered CGS servo patterns CGSS2k+4 to 2k+12 are written on different surfaces of the disk 10. In such a case, even if a part of the CGS servo patterns CGSS2k+8 and CGSS2k+9 intersect, it is possible to determine that the order has been changed. Also, since a part of the CGS servo patterns CGSS2k+8 and CGSS2k+9 does not actually intersect on a same surface, the data at the portion where the CGS servo patterns CGSS2k+8 and CGSS2k+9 intersect is not lost. Therefore, the RRO can be measured accurately by writing the plurality of odd-numbered CGS servo patterns CGSS2k+3 to 2k+11 and the plurality of even-numbered CGS servo patterns CGSS2k+4 to 2k+12 on different surfaces of the disk 10.

The servo pattern control unit 640 writes the FGS servo patterns FGSS, the FS servo patterns FSS, the product servo patterns PSV, and the like on the disk 10. The servo pattern control unit 640 executes a process of writing the GS servo patterns FGSS and the FS servo patterns FSS (hereinafter, may be referred to as "post-processing of BDW") after a process of writing the CGS servo pattern CGSSs in the BDW, and a process of self-servo writing (SSW) of writing the product servo patterns PSV.

As the post-process of BDW, the servo pattern control unit 640 executes calibration for writing the FGS servo patterns FGSS on the disk 10, reads the CGS servo patterns CGSS (or on-track) to position (or on-track) and write the FGS servo patterns FGSS on the disk 10. For example, the servo pattern control unit 640 writes the FGS servo patterns FGSS on the disk 10 from the outer circumference to the inner circumference. Alternatively, the servo pattern control unit 640 may write the FGS servo patterns FGSS on the disk 10 from the inner circumference to the outer circumference.

For example, when a plurality of odd-numbered CGS servo patterns CGSS are written on a predetermined surface 10S of the plurality of surfaces 10S of the disk 10 and a plurality of even-numbered CGS servo patterns CGSS are written on a predetermined surface 10S of the plurality of surfaces 10S of the disk 10, the servo pattern control unit 640 alternately reads the plurality of odd-numbered CGS servo patterns CGSS and the plurality of even-numbered CGS servo patterns CGSS with the plurality of heads 15 to position (or on-track) and write the FGS servo patterns FGSS on a predetermined surface 10S of the disk 10 based on the plurality of odd-numbered CGS servo patterns CGSS and the plurality of even-numbered CGS servo patterns CGSS.

For example, when a plurality of odd-numbered CGS servo patterns CGSS are written on two or more surfaces 10S of the plurality of surfaces 10S of the disks 10 and a plurality of even-numbered CG servo pattern CGSS are written on two or more of surfaces of the plurality of surfaces of the disks 10, the servo pattern control unit 640 selects one surface from the two or more surfaces 10S on which the plurality of odd-numbered CGS servo patterns CGSS are written, alternately reads the plurality of odd-numbered CGS servo patterns CGSS written on the selected surface and the plurality of even-numbered CGS servo pattern CGSS written on the selected surface with the plurality of heads 15 to position (or on-track) and write the FGS servo patterns FGSS on a predetermined surface 10S of the disk 10 based on the plurality of odd-numbered CGS servo patterns CGSS written on the selected surface and the plurality of even-numbered CGS servo patterns CGSS written on the selected surface.

As a post-process of BDW, the servo pattern control unit 640 executes calibration for writing the FS servo patterns FSS on the disk 10 and reads the FGS servo pattern FGSSs to position (or on-track) and write the FS servo patterns FSS on the disk 10. For example, the servo pattern control unit

640 writes the FS servo patterns FSS on the disk 10 from the inner circumference to the outer circumference.

Alternatively, the servo pattern control unit 640 may write the FS servo patterns FSS on the disk 10 from the outer circumference to the inner circumference. The servo pattern control unit 640 reads the FS servo patterns FSS to position (or on-track) and write the product servo patterns PSV on the disk 10.

The positioning control unit 650 executes positioning control of the head 15. The positioning control unit 650 executes positioning control of the head 15 based on the CGS servo patterns CGSS, the FGS servo patterns FGSS, the FS servo patterns FSS, and the product servo patterns PSV. When the plurality of servo patterns CGSS are arranged on a plurality of surfaces of the disk 10, the positioning control unit 650 executes positioning control of the head 15 on one of these surfaces by using all of the plurality of servo patterns CGSS that are arranged on the plurality of surfaces of the disk 10 in a distributed manner while switching between the plurality of heads 15 corresponding to these surfaces. Further, the positioning control unit 650 executes positioning control of the head 15 based on the actual CGS position, the RRO, the virtual CGS interval, the actual CGS interval, and the like measured by the measurement unit 630.

Figure 21:
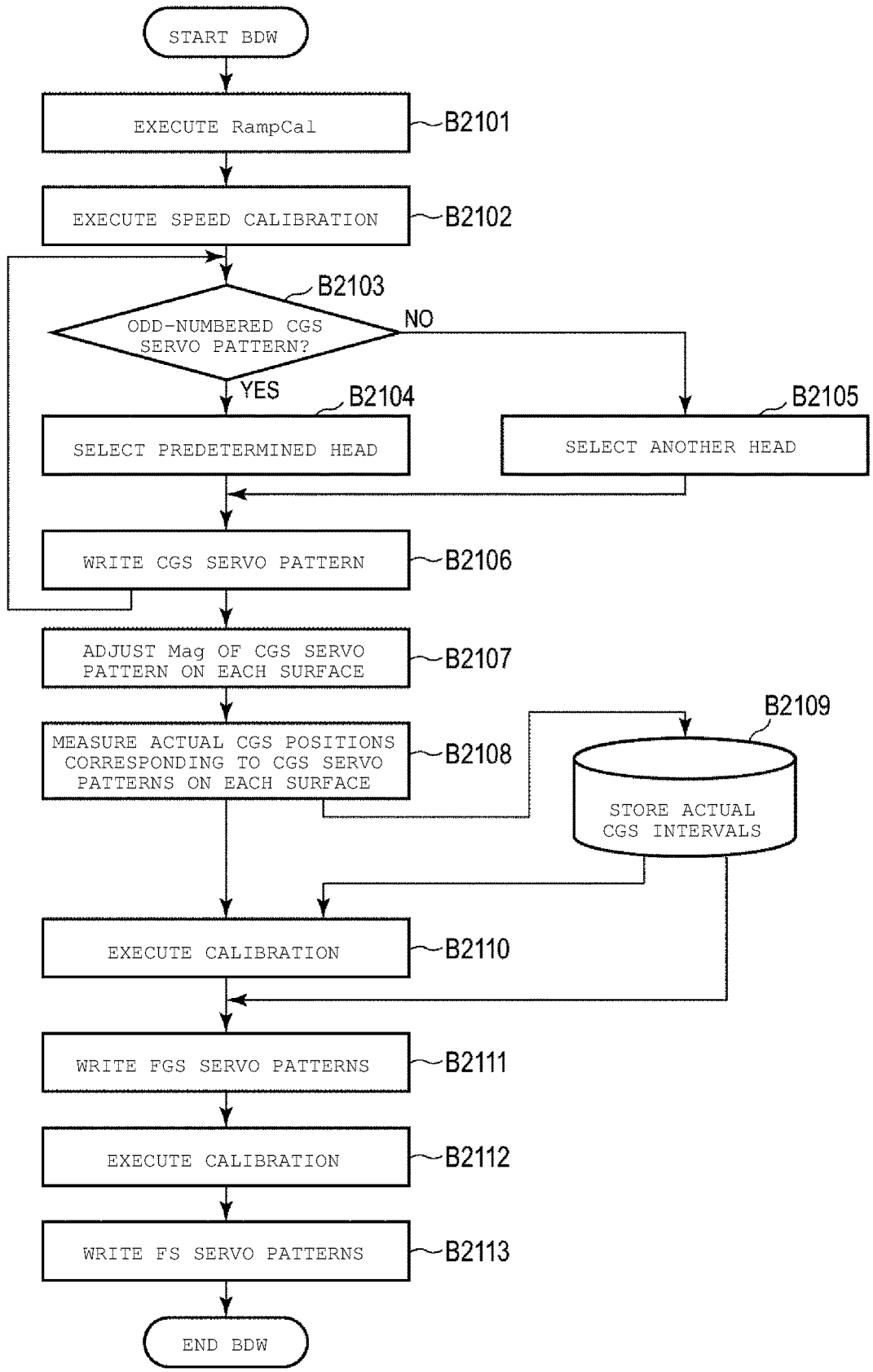
FIG. 21 is a flow chart illustrating an example of blank disk writing (BDW) according to the first embodiment.

FIG. 21 is a flow chart illustrating an example of BDW in the present embodiment.

The MPU 60 starts BDW, executes RampCal (B2101) and speed calibration (B2102) to write the plurality of CGS servo patterns CGSS on different surfaces of the disk 10 while switching the heads 15. Here, RampCal stands for a ramp calibration performed to detect a ramp radial position. The speed calibration is an operation to calibrate a head moving speed for the CGS writing.

The MPU 60 determines whether the CGS servo pattern CGSS to be written is an odd-numbered CGS servo pattern CGSS (B2103). In other words, the MPU 60 determines whether the CGS servo pattern CGSS to be written is an odd-numbered CGS servo pattern CGSS or an even-numbered CGS servo pattern CGSS. When it is determined that the CGS servo pattern CGSS to be written is an odd-numbered CGS servo pattern CGSS (YES in B2103), the MPU 60 selects a predetermined head 15 corresponding to a predetermined surface of the disk 10 (B2104), and proceeds to the processing of B2106. When it is determined that the CGS servo pattern CGSS to be written is not an odd-numbered CGS servo pattern CGSS, that is, the CGS servo pattern CGSS to be written is an even-numbered CGS servo pattern CGSS (NO in B2103), the MPU60 selects another head 15 different from the predetermined head 15 corresponding to another surface different from the predetermined surface of the disk 10 (B2105), and proceeds to the processing of B2106.

The MPU 60 writes the CGS servo pattern CGSS (B2106), proceeds to the processing of B2103 if there is a CGS servo pattern to write, and proceeds to the processing of B2107 if there is no CGS servo pattern to write. The MPU 60 adjusts a Mag of the CGS servo patterns CGSS on each surface on which the CGS servo patterns CGSS are written in a distributed manner (B2107). Here, "Mag" stands for a magnitude of a CGS servo pattern.

The MPU60 measures the actual CGS positions corresponding to the CGS servo patterns CGSS on each of the surfaces to calculate the virtual CGS intervals and the actual CGS intervals based on the actual CGS positions. (B2108). The virtual CGS intervals and the actual CGS intervals are stored in a predetermined storage area, for example, the system area 10b of the disk 10, the volatile memory 70, the nonvolatile memory 80, or the like (B2109).

The MPU 60 executes calibration based on the virtual CGS intervals, the actual CGS intervals, and the like to write the FGS servo patterns FGSS (B2110), and writes the FGS servo patterns FGSS based on the CGS servo patterns CGSS (B2111). The MPU 60 executes calibration for writing the FS servo patterns FSS (B2112) to write the FS servo patterns FSS based on the FGS servo patterns FGSS (B2113).

According to the present embodiment, the magnetic disk device 1 writes the plurality of CGS servo patterns CGSS on different surfaces of one or more disks in a distributed manner. The magnetic disk device 1 writes, for example, two CGS servo patterns CGSS adjacent to each other on the virtual surface of the disk 10 on different surfaces. Therefore, the magnetic disk device 1 can prevent two CGS servo patterns CGSS adjacent to each other on the virtual surface of the disk 10 from being close to each other or intersecting each other on actual surfaces. Even if two adjacent CGS servo patterns CGSS intersect on the virtual surface of the disk 10, since these CGS servo patterns CGSS do not actually intersect on a same surface, data is not lost at the intersections of these CGS servo patterns. Therefore, even if two adjacent CGS servo patterns CGSS intersect on the virtual surface of the disk 10, the magnetic disk device 1 can read these CGS servo patterns CGSS, can accurately detect the positions of these CGS servo patterns CGSS, and accurately acquire the RRO corresponding to these CGS servo pattern CGSS. Therefore, the magnetic disk device 1 can improve the positioning accuracy. As a result, the reliability of the magnetic disk device 1 can be improved.

Next, a magnetic disk device according to a modification example of the first embodiment will be described. In the modification example, the same reference numerals are given to the same elements as those in the first embodiment described above, and detailed description thereof will be omitted.

(Modification Example)

The configuration of the R/W channel 40 of the magnetic disk device 1 according to a modification example is different from that of the magnetic disk device 1 of the first embodiment.

Figure 22:
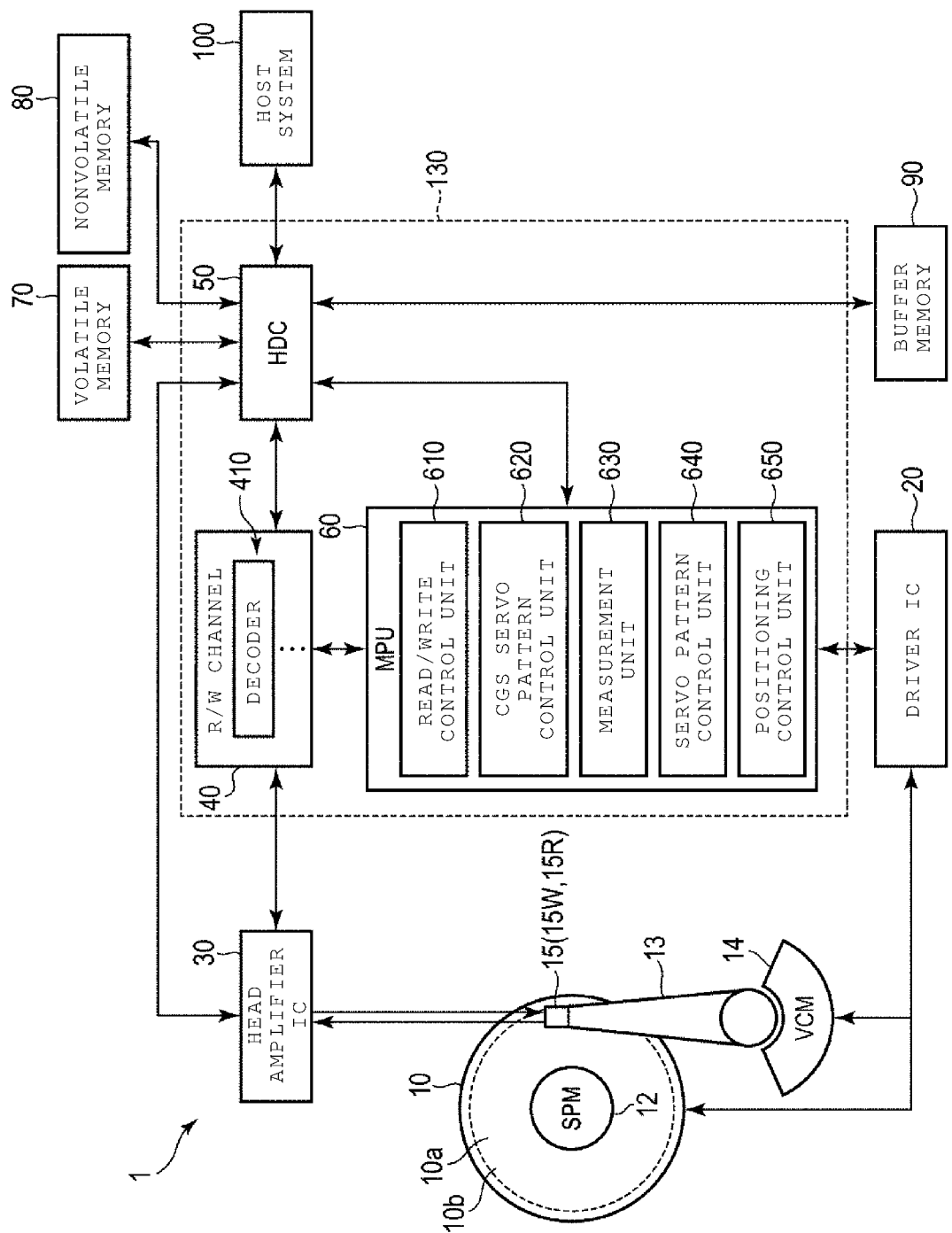
FIG. 22 is a block diagram illustrating a configuration of a magnetic disk device according to a modification example.

FIG. 22 is a block diagram illustrating a configuration of a magnetic disk device according to a modification example.

The R/W channel 40 includes a plurality of decoders 410. Each of the plurality of decoders 410 corresponds to a plurality of heads 15, respectively. That is, the number of the plurality of decoders 410 corresponds to the number of the plurality of heads 15. The plurality of decoders 410 decode each of the signals read by the plurality of heads 15.

When the plurality of CGS servo patterns CGSS are written on different surfaces of the disk 10 in a distributed manner, the measurement unit 630 can simultaneously read the plurality of plurality CGS servo patterns CGSS written on the different surfaces of the disk 10 with the plurality of heads 15, without setting the switchable area and the non-switchable area.

According to the modification example, when the plurality of CGS servo patterns CGSS are written on different surfaces of the disk 10 in a distributed manner, the magnetic disk device 1 can simultaneously read the plurality of plurality CGS servo patterns CGSS written on different surfaces of the disk 10 with the plurality of heads 15, without setting the switchable area and the non-switchable area. Therefore, the magnetic disk device 1 can more efficiently improve the positioning accuracy. The reliability of the magnetic disk device 1 can be improved as in the above embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic disk device comprising:
a disk including a first surface and a second surface opposite to the first surface;
a first head configured to perform reading and writing with respect to the first surface;
a second head configured to perform reading and writing with respect to the second surface;
a motor configured to move the first and second heads with respect to the first and second surfaces, respectively, along a radial direction of the disk; and
a controller configured to alternately activate the first and second heads to perform writing of a plurality of spiral patterns on the first and second surfaces of the disk, respectively, while controlling the motor to move the first and second heads at a predetermined constant speed with respect the first and second surfaces in the radial direction, wherein
during the alternate activation of the first and second heads, the controller activates the first head to write a first spiral pattern on the first surface, and then the second head to write a second spiral pattern on the second surface,
during each activation of the first head, only one first spiral pattern is written on the first surface by the first head, and
during each activation of the second head, only one second spiral pattern is written on the second surface by the second head.

2. A magnetic disk device comprising:
a disk including a first surface and a second surface opposite to the first surface;
a first head configured to perform reading and writing with respect to the first surface;
a second head configured to perform reading and writing with respect to the second surface;
a motor configured to move the first and second heads with respect to the first and second surfaces, respectively, along a radial direction of the disk; and
a controller configured to:
alternately activate the first and second heads to perform writing of a plurality of coarse-guide spiral servo patterns on the first and second surfaces of the disk, respectively, while controlling the motor to move the first and second heads at a predetermined constant speed with respect the first and second surfaces in the radial direction; and
control the first head to write a plurality of fine-guide spiral servo patterns on the first surface while controlling the motor to move the first head according to signals generated by the first and second heads when the first and second heads cross the coarse-guide spiral servo patterns.

3. The magnetic disk device according to claim 2, wherein the controller is further configured to activate the first and second heads to read the coarse-guide spiral servo patterns written on the first and second surfaces, respectively, to determine a position of the first and second heads as the motor is controlled to move the first and second heads.

4. The magnetic disk device according to claim 3, wherein the controller is configured to determine a distance between adjacent coarse-guide spiral servo patterns that are written respectively on the first and second surfaces, and control activation of the first and second heads to read the coarse-guide spiral servo patterns based on the determined distance.

5. The magnetic disk device according to claim 4, wherein the controller is configured to:
when the determined distance is less than a predetermined threshold, activate the first head during a first revolution of the disk to read the coarse-guide spiral servo patterns written on the first surface and activate the second head during a second revolution of the disk to read the coarse-guide spiral servo patterns written on the second surface.

6. The magnetic disk device according to claim 5, wherein the controller is configured to:
when the determined distance is greater than a predetermined threshold, activate the first and second heads during the same revolution of the disk to read the coarse-guide spiral servo patterns written on the first and second surfaces.

7. The magnetic disk device according to claim 6, wherein the controller is configured to set the predetermined threshold based on a seek direction of the first and second heads and the predetermined constant speed.

8. The magnetic disk device according to claim 6, wherein the controller includes a decoder configured to perform decoding of the coarse-guide spiral servo patterns read by the first and second heads.

9. The magnetic disk device according to claim 6, wherein the controller includes a first decoder configured to perform decoding of the coarse-guide spiral servo patterns read by the first head and a second decoder configured to perform decoding of the coarse-guide spiral servo patterns read by the second head.

10. A method for writing in a magnetic disk device, the magnetic disk device including a disk including a first surface and a second surface opposite to the first surface, a first head configured to perform reading and writing with respect to the first surface, a second head configured to perform reading and writing with respect to the second surface, and a motor configured to move the first and second heads with respect to the first and second surfaces, respectively, along a radial direction of the disk, the method comprising:
alternately activating the first and second heads to perform writing of a plurality of spiral patterns on the first and second surfaces of the disk, respectively, while controlling the motor to move the first and second heads at a predetermined constant speed with respect to the first and second surfaces in the radial direction, wherein
during the alternate activation of the first and second heads, the first head is activated to write a first spiral pattern on the first surface, and then the second head is activated to write a second spiral pattern on the second surface,
during each activation of the first head, only one first spiral pattern is written on the first surface by the first head, and during each activation of the second head, only one second spiral pattern is written on the second surface by the second head.

11. The method according to claim 10, wherein
the plurality of spiral patterns are coarse-guide spiral servo patterns, and
the method further comprises controlling the first head to write a plurality of fine-guide spiral servo patterns on the first surface while controlling the motor to move the first head according to signals generated by the first and second heads when the first and second heads cross the coarse-guide spiral servo patterns.

12. The method according to claim 11, further comprising:
activating the first head and the second head to read the coarse-guide spiral servo patterns written on the first surface and the second surface, respectively, to determine a position of the first and second heads as the motor is controlled to move the first and second heads.

13. The method according to claim 12, further comprising:
determining a distance between adjacent coarse-guide spiral servo patterns that are written respectively on the first and second surfaces; and
controlling activation of the first and second heads to read the coarse-guide spiral servo patterns based on the determined distance.

14. The method according to claim 13, further comprising:
when the determined distance is less than a predetermined threshold, activating the first head during a first revolution of the disk to read the coarse-guide spiral servo patterns written on the first surface and activating the second head during a second revolution of the disk to read the coarse-guide spiral servo patterns written on the second surface.

15. The method according to claim 14, further comprising:
when the determined distance is greater than a predetermined threshold, activating the first and second heads during the same revolution of the disk to read the coarse-guide spiral servo patterns written on the first and second surfaces.

16. The method according to claim 14, further comprising:
setting the predetermined threshold based on a seek direction of the first and second heads and the predetermined constant speed.

17. The magnetic disk device according to claim 1, wherein
the plurality of spiral patterns are coarse-guide spiral servo patterns, and
the controller is further configured to control the first head to write a plurality of fine-guide spiral servo patterns on the first surface while controlling the motor to move the first head according to signals generated by the first and second heads when the first and second heads cross the coarse-guide spiral servo patterns.

18. The magnetic disk device according to claim 17, wherein the controller is further configured to activate the first and second heads to read the coarse-guide spiral servo patterns written on the first and second surfaces, respectively, to determine a position of the first and second heads as the motor is controlled to move the first and second heads.

19. The magnetic disk device according to claim 18, wherein the controller is configured to determine a distance between adjacent coarse-guide spiral servo patterns that are written respectively on the first and second surfaces, and control activation of the first and second heads to read the coarse-guide spiral servo patterns based on the determined distance.

20. The magnetic disk device according to claim 19, wherein the controller is configured to:
when the determined distance is less than a predetermined threshold, activate the first head during a first revolution of the disk to read the coarse-guide spiral servo patterns written on the first surface and activate the second head during a second revolution of the disk to read the coarse-guide spiral servo patterns written on the second surface.

* * * * *